US010235415B1

(12) United States Patent
Lu

(10) Patent No.: US 10,235,415 B1
(45) Date of Patent: Mar. 19, 2019

(54) ITERATIVE VARIANCE AND/OR STANDARD DEVIATION CALCULATION FOR BIG DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 353 days.

(21) Appl. No.: 14/964,436

(22) Filed: Dec. 9, 2015

Related U.S. Application Data

(60) Provisional application No. 62/089,257, filed on Dec. 9, 2014.

(51) Int. Cl.
| | |
|---|---|
| *G06F 7/02* | (2006.01) |
| *G06F 17/30* | (2006.01) |
| *G06F 17/18* | (2006.01) |
| *G06Q 40/00* | (2012.01) |

(52) U.S. Cl.
CPC ........ *G06F 17/30442* (2013.01); *G06F 17/18* (2013.01); *G06F 17/30241* (2013.01); *G06Q 40/00* (2013.01)

(58) Field of Classification Search
CPC .... G06F 17/11; G06F 17/18; G06F 17/30241; G06F 17/30; G06Q 40/00
See application file for complete search history.

(56) References Cited

U.S. PATENT DOCUMENTS

| | | | | |
|---|---|---|---|---|
| 5,586,060 A | * | 12/1996 | Kuno | ................. G06F 15/0225 702/179 |
| 7,747,413 B2 | | 6/2010 | Ramsey et al. | |
| 7,840,377 B2 | | 11/2010 | Ramsey et al. | |
| 9,069,726 B2 | | 6/2015 | Lu | |
| 2014/0164456 A1 | | 6/2014 | Lu | |
| 2017/0225720 A1 | * | 8/2017 | Sanders | ................. B21C 37/00 |

FOREIGN PATENT DOCUMENTS

| | | |
|---|---|---|
| WO | WO-2014093540 A2 | 6/2014 |
| WO | WO-2014093540 A3 | 9/2014 |

* cited by examiner

*Primary Examiner* — Bruce M Moser

(57) ABSTRACT

The present invention extends to methods, systems, and computing system program products for iteratively calculating variance and/or standard deviation for Big Data. Embodiments of the invention include iteratively calculating one or more components of a variance and/or a standard deviation in a modified computation subset based on iteratively calculated one or more components of the variance and/or the standard deviation calculated for a previous computation subset and then calculating the variance and/or the standard deviation based on the iteratively calculated components. Iteratively calculating the components of variance and/or standard deviation avoids visiting all data elements in the modified computation subset and performing redundant computations thereby increasing calculation efficiency, saving computing resources and reducing computing system's power consumption.

20 Claims, 24 Drawing Sheets

The Definitions of Variance and Standard Deviation:

Suppose computation subset $X$ composes of $n$ data elements: $X = \{x_i | i = 1, \ldots, n\}$ which is a subset of a Big Data set.

Define the sum of the data elements in $X$ in the $k^{th}$ iteration as below:

$$S_k = x_1 + x_2 + x_3 + \cdots + x_n = \sum_1^n x_i \qquad \diagdown\!\!\!\diagup 401$$

Define the mean of the data elements in the $k^{th}$ iteration as below:

$$\bar{x}_k = \frac{(x_1 + x_2 + x_3 + \cdots + x_n)}{n} = \frac{\sum_1^n x_i}{n} \qquad \diagdown\!\!\!\diagup 402$$

The sample variance of $X$ in the $k^{th}$ iteration is defined as:

$$vs_k = \frac{1}{n-1} \sum_1^n (x_i - \bar{x}_k)^2 \qquad \diagdown\!\!\!\diagup 403$$

The population variance of $X$ in the $k^{th}$ iteration is defined as:

$$vp_k = \frac{1}{n} \sum_1^n (x_i - \bar{x}_k)^2 \qquad \diagdown\!\!\!\diagup 404$$

The sample standard deviation of $X$ in the $k^{th}$ iteration is defined as:

$$s_k = \sqrt[2]{vs_k} = \sqrt[2]{\frac{1}{n-1} \sum_1^n (x_i - \bar{x}_k)^2} \qquad \diagdown\!\!\!\diagup 405$$

The population standard deviation of $X$ in the $k^{th}$ iteration is defined as:

$$\sigma_k = \sqrt[2]{vp_k} = \sqrt[2]{\frac{1}{n} \sum_1^n (x_i - \bar{x}_k)^2} \qquad \diagdown\!\!\!\diagup 406$$

Now, suppose the variance and standard deviation of the computation subset $X$ with a fixed size $n$ need to be calculated again after an existing data element $x_r$ ($1 \leq r \leq n$) in $X$ is removed and a data element $x_a$ is added to $X$.

Fig. 4A

The Definitions of Variance and Standard Deviation (Cont'd):

Define the modified computation subset as $X'$.

Define the sum of the data elements in $X'$ in the k+1$^{th}$ iteration as below:

$$S_{k+1} = x_1 + x_2 + \cdots + x_n + x_a - x_r = \sum_1^n x_i + x_a - x_r \qquad \sim\!\!\_407$$

Define the mean of the data elements in $X'$ in the k+1$^{th}$ iteration as below:

$$\bar{x}_{k+1} = \frac{(x_1 + x_2 + \cdots + x_n + x_a - x_r)}{n} = \frac{\sum_1^n x_i + x_a - x_r}{n} \qquad \sim\!\!\_408$$

The sample variance of $X'$ in the k+1$^{th}$ iteration is defined as:

$$vs_{k+1} = \frac{1}{n-1}(\sum_1^n (x_i - \bar{x}_{k+1})^2 + (x_a - \bar{x}_{k+1})^2 - (x_r - \bar{x}_{k+1})^2) \qquad \sim\!\!\_409$$

The population variance of $X'$ in the k+1$^{th}$ iteration is defined as:

$$vp_{k+1} = \frac{1}{n}(\sum_1^n (x_i - \bar{x}_{k+1})^2 + (x_a - \bar{x}_{k+1})^2 - (x_r - \bar{x}_{k+1})^2) \qquad \sim\!\!\_410$$

The sample standard deviation of $X'$ in the k+1$^{th}$ iteration is defined as:

$$s_{k+1} = \sqrt[2]{vs_{k+1}} = \sqrt[2]{\frac{1}{n-1}(\sum_1^n (x_i - \bar{x}_{k+1})^2 + (x_a - \bar{x}_{k+1})^2 - (x_r - \bar{x}_{k+1})^2)} \qquad \sim\!\!\_411$$

The population standard deviation of $X'$ in the k+1$^{th}$ iteration is defined as:

$$\sigma_{k+1} = \sqrt[2]{vp_{k+1}} = \sqrt[2]{\frac{1}{n}(\sum_1^n (x_i - \bar{x}_{k+1})^2 + (x_a - \bar{x}_{k+1})^2 - (x_r - \bar{x}_{k+1})^2)} \qquad \sim\!\!\_412$$

Fig. 4A Cont'd

Some Example Components of Variance and/or Standard Deviation:

- $vs_k = \frac{1}{n-1}\sum_1^n(x_i - \bar{x}_k)^2$ for a sample variance and a sample standard deviation
- $vp_k = \frac{1}{n}\sum_1^n(x_i - \bar{x}_k)^2$ for a population variance and a population standard deviation
- $SSD_k = \sum_1^n(x_i - \bar{x}_k)^2$, $S_k = \sum_1^n x_i$, $\bar{x}_k = \frac{1}{n}\sum_1^n x_i$ and $SS_k = \sum_1^n x_i^2$ for a sample variance, a sample standard deviation, a population variance and a population standard deviation
- $s_k = \sqrt{\frac{1}{n-1}\sum_1^n(x_i - \bar{x}_k)^2}$ for a sample standard deviation
- $\sigma_k = \sqrt{\frac{1}{n}\sum_1^n(x_i - \bar{x}_k)^2}$ for a population standard deviation Basic Iterative Component Calculation Equations:

The sum or mean of the data within the computation subset will be used by several examples of iterative algorithms described in the following sections, so put its calculation here instead of in each algorithms.

According to equation 401 and equation 407, $S_{k+1}$ can be calculated in an iterative way:

$S_{k+1} = S_k + x_a - x_r$ ⌒‿413

According to equation 402 and equation 408, $\bar{x}_{k+1}$ can be calculated in an iterative way:

$\bar{x}_{k+1} = \bar{x}_k + \frac{(x_a - x_r)}{n}$ ⌒‿414

Fig. 4B

Example Algorithm 1:

Sample variance $\frac{1}{n-1}\sum_{1}^{n}(x_i - \bar{x}_k)^2$ itself is a component of sample variance and sample standard deviation. Sample variance can be iteratively calculated based on sample variance in previous moving computation window and another component $S_{k+1}$ or $\bar{x}_{k+1}$ defined in Figure 4A and Figure 4B.

$$vs_{k+1} = vs_k + \frac{1}{n-1}\left((x_a + x_r - (S_{k+1} + S_k)/n)(x_a - x_r)\right) = vs_k + \frac{1}{n-1}\left((x_a + x_r - (\bar{x}_{k+1} + \bar{x}_k))(x_a - x_r)\right) \qquad 415$$

Once $vs_{k+1}$ is calculated, then sample standard deviation can be calculated by $$s_{k+1} = \sqrt[2]{vs_{k+1}} \qquad 416$$

Population variance $\frac{1}{n}\sum_{1}^{n}(x_i - \bar{x}_k)^2$ itself is a component of population variance and population standard deviation. Population variance can be iteratively calculated based on population variance in previous moving computation window and another component $S_{k+1}$ or $\bar{x}_{k+1}$ defined in Figure 4A and Figure 4B.

$$vp_{k+1} = vp_k + \frac{1}{n}\left((x_a + x_r - (S_{k+1} + S_k)/n)(x_a - x_r)\right) = vp_k + \frac{1}{n}\left((x_a + x_r - (\bar{x}_{k+1} + \bar{x}_k))(x_a - x_r)\right) \qquad 417$$

Once $vp_{k+1}$ is calculated, then population standard deviation can be calculated by $$\sigma_{k+1} = \sqrt[2]{vp_{k+1}} \qquad 418$$

Fig. 4C

Iterative Algorithm 2:

$\sum_1^n(x_i - \bar{x}_k)^2$ is a component of variance and standard deviation. $\sum_1^n(x_i - \bar{x}_k)^2$ can be iteratively calculated based on another component $S_{k+1}$ or $\bar{x}_{k+1}$ defined in Figure 4A and Figure 4B.

Define $SSD_k = \sum_1^n(x_i - \bar{x}_k)^2$ and $SSD_{k+1} = \sum_1^n(x_i - \bar{x}_{k+1})^2 + (x_a - \bar{x}_{k+1})^2 - (x_r - \bar{x}_{k+1})^2$, then $SSD_{k+1}$ can be iteratively calculated.

$SSD_{k+1} = SSD_k + (x_a - x_r)((x_a+x_r) - (S_k + S_{k+1})/n) = SSD_k + (x_a - x_r)((x_a+x_r) - (\bar{x}_k + \bar{x}_{k+1}))$    419

Once $SSD_{k+1}$ is calculated, then $vs_{k+1} = \frac{SSD_{k+1}}{n-1}$    420

$vp_{k+1} = \frac{SSD_{k+1}}{n}$    421

$s_{k+1} = \sqrt[2]{vs_{k+1}} = \sqrt[2]{\frac{SSD_{k+1}}{n-1}}$    422

$\sigma_{k+1} = \sqrt[2]{vp_{k+1}} = \sqrt[2]{\frac{SSD_{k+1}}{n}}$    423

Fig. 4D

Iterative Algorithm 3:

Variance and standard deviation are calculated based on components $\bar{x}_{k+1}$ defined in equation 411 and $SS_{k+1}$ defined below.

$SS_k = \sum_1^n x_i^2$ ⌒⌒⌒ 424

$SS_{k+1} = \sum_1^n x_i^2 + x_a^2 - x_r^2$ ⌒⌒⌒ 425

$SS_{k+1}$ can be calculated in an iterative way:

$SS_{k+1} = SS_k + x_a^2 - x_r^2$ ⌒⌒⌒ 426

Once $\bar{x}_{k+1}$ and $SS_{k+1}$ are calculated, then $vs_{k+1} = \frac{SS_{k+1} - S_{k+1}^2/n}{n-1} = \frac{SS_{k+1} - \bar{x}_{k+1} S_{k+1}}{n-1} = \frac{SS_{k+1} - n\bar{x}_{k+1}^2}{n-1}$ ⌒⌒⌒ 427

$vp_{k+1} = \frac{SS_{k+1}}{n} - (S_{k+1}/n)^2 = \frac{SS_{k+1} - \bar{x}_{k+1} S_{k+1}}{n} = \frac{SS_{k+1}}{n} - \bar{x}_{k+1}^2$ ⌒⌒⌒ 428

$s_{k+1} = \sqrt[2]{vs_{k+1}} = \sqrt[2]{\frac{SS_{k+1} - S_{k+1}^2/n}{n-1}} = \sqrt[2]{\frac{SS_{k+1} - \bar{x}_{k+1} S_{k+1}}{n-1}} = \sqrt[2]{\frac{SS_{k+1} - n\bar{x}_{k+1}^2}{n-1}}$ ⌒⌒⌒ 429

$\sigma_{k+1} = \sqrt[2]{vp_{k+1}} = \sqrt[2]{\frac{SS_{k+1}}{n} - (S_{k+1}/n)^2} = \sqrt[2]{\frac{SS_{k+1} - \bar{x}_{k+1} S_{k+1}}{n}} = \sqrt[2]{\frac{SS_{k+1}}{n} - \bar{x}_{k+1}^2}$ ⌒⌒⌒ 430

Fig. 4E

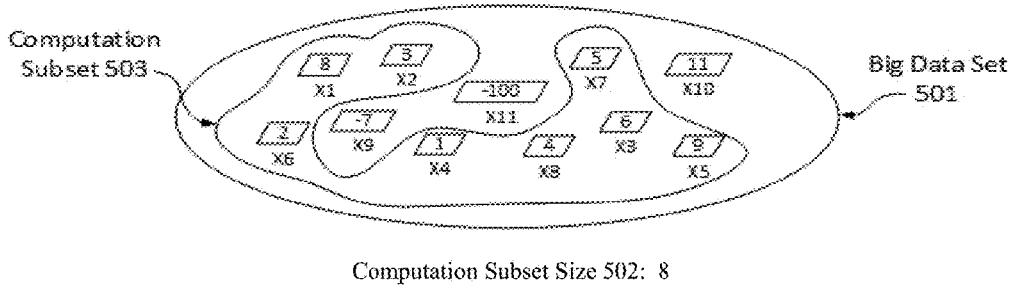

Computation Subset Size 502: 8

<u>Calculate Sample Variance and Sample Standard Deviation for Computation Subset 503</u>

Traditional Algorithm:

1. Use equation 402 to calculate $\bar{x}_1$ of computation subset 503 for the 1$^{st}$ iteration:

$$\bar{x}_1 = \frac{8+3+6+1+9+2+5+4}{8} = \frac{38}{8} = 4.75$$

Operations in this step: 1 division, 7 additions

2. Use equation 403 to calculate the sample variance $vs_1$ for the 1$^{st}$ iteration:

$$vs_1 = \frac{1}{8-1}\sum_1^8(x_i - \bar{x}_1)^2 = \frac{1}{8-1}((8-4.75)^2 + (3-4.75)^2 + (6-4.75)^2 + (1-4.75)^2 +$$
$$(9-4.75)^2 + (2-4.75)^2 + (5-4.75)^2 + (4-4.75)^2) = \frac{1}{7}(10.5625 + 3.0625 + 1.5625 +$$
$$14.0625 + 18.0625 + 7.5625 + 0.0625 + 0.5625) = \frac{1}{7} \times 55.5 = 7.9285714285714286$$

Operations in this step: 1 division, 8 multiplications, 7 additions, 9 subtractions 3. Use equation 405 to calculate the sample standard deviation $s_1$ for the 1$^{st}$ iteration:

$$s_1 = \sqrt[2]{\frac{1}{8-1}\sum_1^8(x_i - \bar{x}_1)^2} = \sqrt[2]{7.9285714285714286} = 2.815771906346718$$

Operations in this step: 1 square root

There are a total of 2 divisions, 8 multiplications, 14 additions and 9 subtractions when calculating the variance and with additionally 1 square root when calculating the sample standard deviation.

Fig. 5A

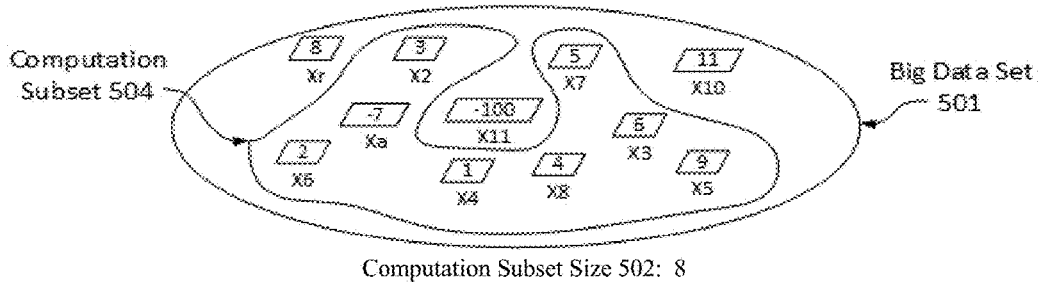

Computation Subset Size 502: 8

Calculate Sample Variance and Sample Standard Deviation for Computation Subset 504

Traditional Algorithm:

1. Use equation 402 to calculate $\bar{x}_2$ of computation subset 504 for the 2$^{nd}$ iteration:

$$\bar{x}_2 = \frac{3+6+1+9+2+5+4+(-7)}{8} = \frac{23}{8} = 2.875$$

Operations in this step: 1 division, 7 additions

2. Use equation 403 to calculate the sample variance $vs_2$ for the 2$^{nd}$ iteration:

$$vs_2 = \frac{1}{8-1}(\Sigma_2^8(x_i - \bar{x}_2)^2 + (x_a - \bar{x}_2)^2) = \frac{1}{8-1}((3-2.875)^2 + (6-2.875)^2 + (1-2.875)^2 +$$
$$(9-2.875)^2 + (2-2.875)^2 + (5-2.875)^2 + (4-2.875)^2 + (-7-2.875)^2) = \frac{1}{7}(0.015625 +$$
$$9.765625 + 3.515625 + 37.515625 + 0.765625 + 4.515625 + 1.265625 + 97.515625) = \frac{1}{7} \times$$
$$154.875 = 22.125$$

Operations in this step: 1 division, 8 multiplications, 7 additions, 9 subtractions 3. Use equation 405 to calculate the sample standard deviation $s_2$ for the 2$^{nd}$ iteration:

$$s_2 = \sqrt[2]{\frac{1}{8-1}(\Sigma_2^8(x_i - \bar{x}_2)^2 + (x_a - \bar{x}_2)^2)} = \sqrt[2]{22.125} = 4.703721930556695$$

Operations in this step: 1 square root

There are also a total of 2 divisions, 8 multiplications, 14 additions and 9 subtractions when calculating the sample variance and with additionally 1 square root when calculating the sample standard deviation.

Fig. 5A Cont'd 1

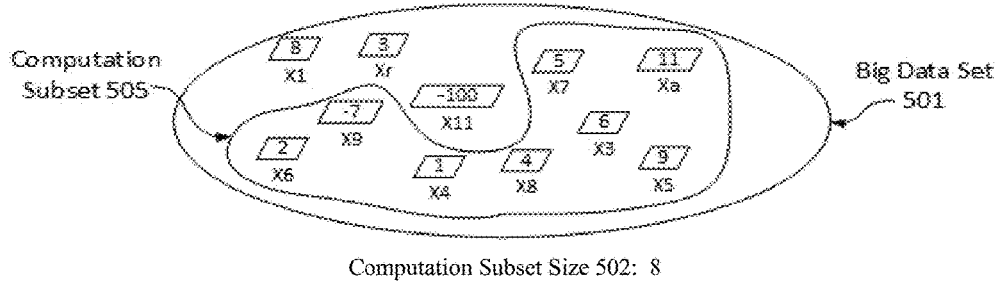

Computation Subset Size 502: 8

Calculate Sample Variance and Sample Standard Deviation for Computation Subset 505

Traditional Algorithm:

1. Use equation 402 to calculate $\bar{x}_3$ of computation subset 505 for the 3$^{rd}$ iteration:

$$\bar{x}_3 = \frac{6+1+9+2+5+4+(-7)+11}{8} = \frac{31}{8} = 3.875$$

Operations in this step: 1 division, 7 additions

2. Use equation 403 to calculate the sample variance $vs_3$ for the 3$^{rd}$ iteration:

$$vs_3 = \frac{1}{8-1}(\Sigma_3^9(x_i - \bar{x}_3)^2 + (x_a - \bar{x}_3)^2) = \frac{1}{8-1}((6 - 3.875)^2 + (1 - 3.875)^2 + (9 - 3.875)^2 + (2 - 3.875)^2 + (5 - 3.875)^2 + (4 - 3.875)^2 + (-7 - 3.875)^2 + (11 - 3.875)^2) = \frac{1}{7}(4.515625 + 8.265625 + 26.265625 + 3.515625 + 1.265625 + 0.015625 + 118.265625 + 50.765625) = \frac{1}{7} \times 212.875 = 30.41071428571429$$

Operations in this step: 1 division, 8 multiplications, 7 additions, 9 subtractions 3. Use equation 405 to calculate the sample standard deviation $s_3$ for the 3$^{rd}$ iteration:

$$s_3 = \sqrt[2]{\frac{1}{8-1}(\Sigma_3^9(x_i - \bar{x}_3)^2 + (x_a - \bar{x}_3)^2)} = \sqrt[2]{30.41071428571429} = 5.514591035218685$$

Operations in this step: 1 square root

There are also a total of 2 divisions, 8 multiplications, 14 additions and 9 subtractions when calculating the sample variance and with additionally 1 square root when calculating the sample standard deviation.

For number of $n$ data, traditional algorithms typically use 2 divisions, $n$ multiplications, $2(n-1)$ additions and $n+1$ subtractions when calculating sample variance and with additionally 1 square root when calculating the sample standard deviation without any optimization.

Fig. 5A Cont'd 2

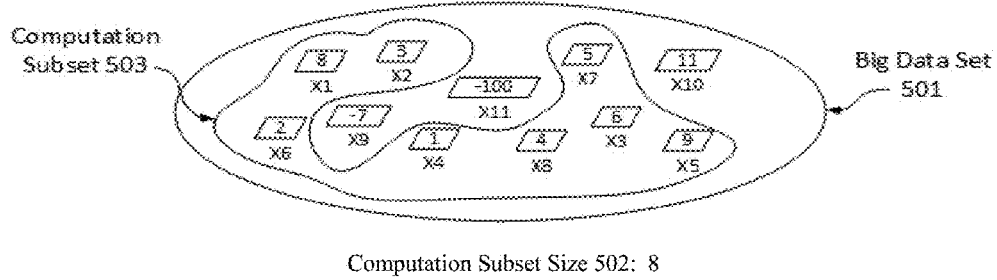

Computation Subset Size 502: 8

Calculate Sample Variance and Sample Standard Deviation for Computation Subset 503

Iterative Algorithm 1:

1. Use equation 402 to calculate $\bar{x}_1$ of computation subset 503 for the 1$^{st}$ iteration:

$$\bar{x}_1 = \frac{8+3+6+1+9+2+5+4}{8} = \frac{38}{8} = 4.75$$

Operations in this step: 1 division, 7 additions

2. Use equation 403 to calculate the sample variance $vs_1$ for the 1$^{st}$ iteration:

$$vs_1 = \frac{1}{8-1}\sum_1^8(x_i - \bar{x}_1)^2 = \frac{1}{8-1}((8 - 4.75)^2 + (3 - 4.75)^2 + (6 - 4.75)^2 + (1 - 4.75)^2 +$$
$$(9 - 4.75)^2 + (2 - 4.75)^2 + (5 - 4.75)^2 + (4 - 4.75)^2) = \frac{1}{7}(10.5625 + 3.0625 + 1.5625 +$$
$$14.0625 + 18.0625 + 7.5625 + 0.0625 + 0.5625) = \frac{1}{7} \times 55.5 = 7.9285714285714286$$

Operations in this step: 1 division, 8 multiplications, 7 additions, 9 subtractions 3. Use equation 405 to calculate the sample standard deviation $s_1$ for the 1$^{st}$ iteration:

$$s_1 = \sqrt[2]{vs_1} = \sqrt[2]{7.9285714285714286} = 2.815771906346718$$

Operations in this step: 1 square root

There are a total of 2 divisions, 8 multiplications, 14 additions and 9 subtractions when calculating the sample variance and with additionally 1 square root when calculating the sample standard deviation.

Fig. 5B

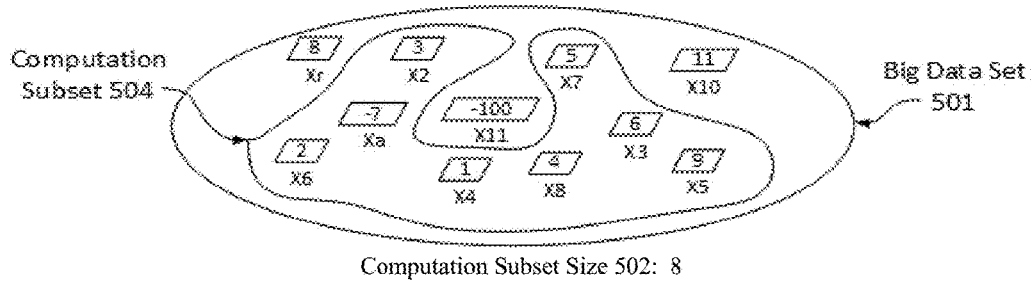

Computation Subset Size 502: 8

<u>Calculate Sample Variance and Sample Standard Deviation for Computation Subset 504</u>

Iterative algorithm 1:

1. Use equation 414 to iteratively calculate $\bar{x}_2$ for the 2$^{nd}$ iteration:

$$\bar{x}_2 = \bar{x}_1 + \frac{(x_a - x_r)}{8} = 4.75 + \frac{(-7-8)}{8} = 4.75 - \frac{15}{8} = 2.875$$

Operations in this step: 1 division, 1 addition, 1 subtraction

2. Use equation 415 to iteratively calculate sample variance $vs_2$ for the 2$^{nd}$ iteration:

$$vs_2 = vs_1 + \frac{(x_a + x_r - (\bar{x}_2 + \bar{x}_1))(x_a - x_r)}{8-1} = 7.9285714285714286 + \frac{(-7+8-(2.875+4.75))(-7-8)}{7} =$$
$$7.9285714285714286 + \frac{(1-7.625)(-15)}{7} = 7.9285714285714286 + \frac{(-6.625)(-15)}{7} =$$
$$7.9285714285714286 + \frac{99.375}{7} = 7.9285714285714286 + 14.1964285714285714 = 22.125$$

Operations in this step: 1 division, 1 multiplication, 3 additions, 3 subtractions 3. Use equation 416 to calculate the sample standard deviation $s_2$ for the 2$^{nd}$ iteration:

$$s_2 = \sqrt[2]{vs_2} = \sqrt[2]{22.125} = 4.703721930556695$$

Operations in this step: 1 square root

There are a total of 2 divisions, 1 multiplication, 4 additions and 4 subtractions when calculating the sample variance and with additionally 1 square root when calculating the sample standard deviation.

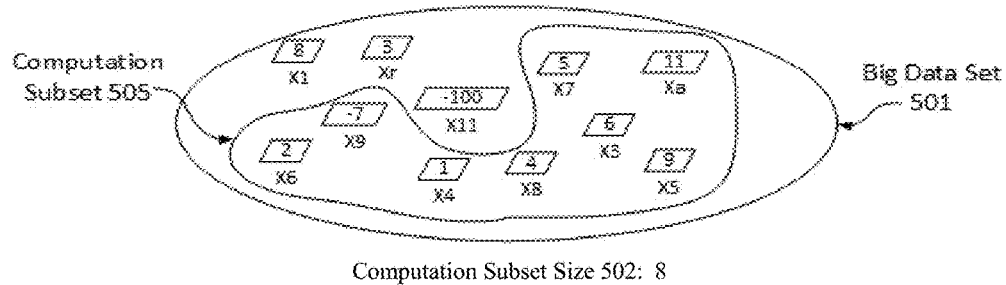

Computation Subset Size 502: 8

<u>Calculate Sample Variance and Sample Standard Deviation for Computation Subset 505</u>

Iterative algorithm 1:

1. Use equation 414 to iteratively calculate $\bar{x}_3$ for the 3$^{rd}$ iteration:

$$\bar{x}_3 = \bar{x}_2 + \frac{(x_a - x_r)}{8} = 2.875 + \frac{(11-3)}{8} = 2.875 + \frac{8}{8} = 3.875$$

Operations in this step: 1 division, 1 addition, 1 subtraction

2. Use equation 415 to iteratively calculate sample variance $vs_3$ for the 3$^{rd}$ iteration:

$$vs_3 = vs_2 + \frac{(x_a + x_r - (\bar{x}_3 + \bar{x}_2))(x_a - x_r)}{8-1} = 22.125 + \frac{(11+3-(3.875+2.875))(11-3)}{7} = 22.125 + \frac{(14-6.75)(8)}{7} =$$
$$22.125 + \frac{(7.25)(8)}{7} = 30.41071428571429$$

Operations in this step: 1 division, 1 multiplication, 3 additions, 3 subtractions 3. Use equation 416 to calculate the sample standard deviation $s_3$ for the 3$^{rd}$ iteration:

$$s_3 = \sqrt[2]{vs_3} = \sqrt[2]{30.41071428571429} = 5.514591035218685$$

Operations in this step: 1 square root

There are also a total of 2 divisions, 1 multiplication, 4 additions and 4 subtractions when calculating the sample variance and with additionally 1 square root when calculating the sample standard deviation.

Fig. 5B Cont'd 2

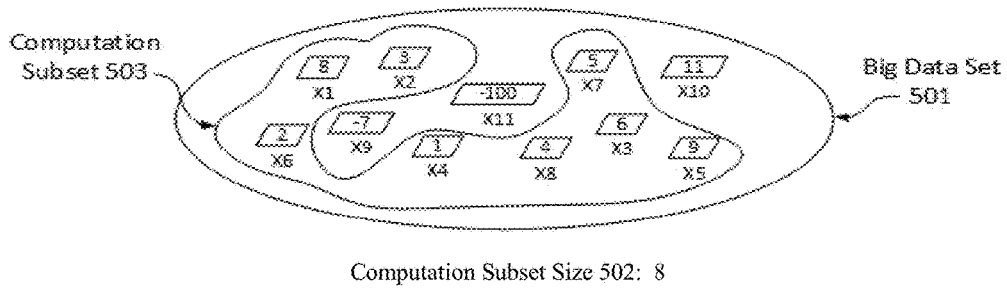

Computation Subset Size 502: 8

<u>Calculate Sample Variance and Sample Standard Deviation for Computation Subset 503</u>

Iterative Algorithm 2:

1. Use equation 402 to calculate $\bar{x}_1$ of computation subset 503 for the 1st iteration:

$$\bar{x}_1 = \frac{8+3+6+1+9+2+5+4}{8} = \frac{38}{8} = 4.75$$

Operations in this step: 1 division, 7 additions

2. Calculate $SSD_1 = \sum_1^8(x_i - \bar{x}_1)^2$ for the 1st iteration:

$SSD_1 = \sum_1^8(x_i - \bar{x}_1)^2 = ((8 - 4.75)^2 + (3 - 4.75)^2 + (6 - 4.75)^2 + (1 - 4.75)^2 + (9 - 4.75)^2 + (2 - 4.75)^2 + (5 - 4.75)^2 + (4 - 4.75)^2) = (10.5625 + 3.0625 + 1.5625 + 14.0625 + 18.0625 + 7.5625 + 0.0625 + 0.5625) = 55.5$ Operations in this step: 8 multiplications, 7 additions, 8 subtractions 3. Calculate the sample variance $vs_1$ for the 1st iteration:

$$vs_1 = \frac{\sum_1^8(x_i - \bar{x}_1)^2}{8-1} = \frac{55.5}{7} = 7.9285714285714286$$

Operations in this step: 1 division, 1 subtraction

4. Calculate the sample standard deviation $s_1$ for the 1st iteration:

$$s_1 = \sqrt[2]{vs_1} = \sqrt[2]{7.9285714285714286} = 2.815771906346718$$

Operations in this step: 1 square root

There are a total of 2 divisions, 8 multiplications, 14 additions and 9 subtractions when calculating the sample variance and with additionally 1 square root when calculating the sample standard deviation.

Fig. 5C

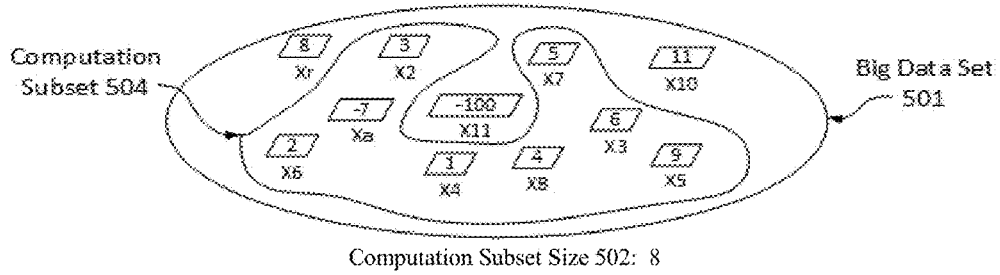

Computation Subset Size 502: 8

Calculate Sample Variance and Sample Standard Deviation for Computation Subset 504

Iterative Algorithm 2:

1. Use equation 414 to iteratively calculate $\bar{x}_2$ for the $2^{nd}$ iteration:

$$\bar{x}_2 = \bar{x}_1 + \frac{(x_a - x_r)}{8} = 4.75 + \frac{(-7 - 8)}{8} = 2.875$$

Operations in this step: 1 division, 1 addition, 1 subtraction

2. Use equation 419 to iteratively calculate $SSD_2$ for the $2^{nd}$ iteration:

$$SSD_2 = SSD_1 + \left((x_a + x_r - (\bar{x}_2 + \bar{x}_1))(x_a - x_r)\right) = 55.5 + \left((-7 + 8 - (2.875 + 4.75))(-7 - 8)\right) = 55.5 + \left((1 - 7.625)(-15)\right) = 55.5 + \left((-6.625)(-15)\right) = 154.875$$

Operations in this step: 1 multiplication, 3 additions, 2 subtractions

3. Use equation 420 to calculate the sample variance $vs_2$ for the $2^{nd}$ iteration:

$$vs_2 = \frac{SSD_2}{8-1} = \frac{154.875}{7} = 22.125$$

Operations in this step: 1 division, 1 subtraction

4. Use equation 422 to calculate the sample standard deviation $s_2$ for the $2^{nd}$ iteration:

$$s_2 = \sqrt[2]{vs_2} = \sqrt[2]{22.125} = 4.7037219305566948$$

Operations in this step: 1 square root

There are a total of 2 divisions, 1 multiplication, 4 additions and 4 subtractions when calculating the sample variance and with additionally 1 square root when calculating the sample standard deviation.

Fig. 5C Cont'd 1

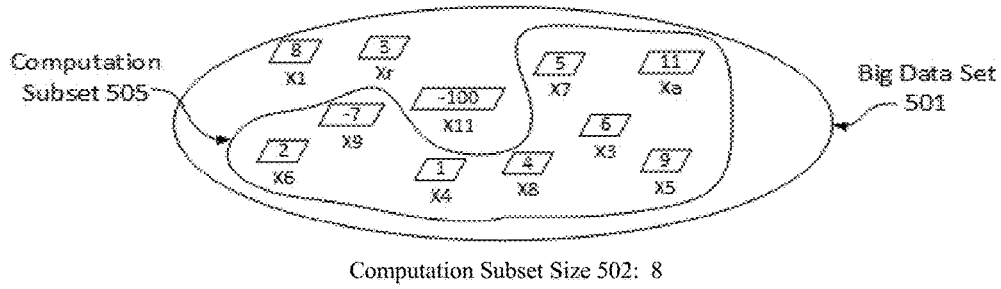

Computation Subset Size 502: 8

Calculate Sample Variance and Sample Standard Deviation for Computation Subset 505

Iterative Algorithm 2:

1. Use equation 414 to iteratively calculate $\bar{x}_3$ for the 3$^{rd}$ iteration:

$$\bar{x}_3 = \bar{x}_2 + \frac{(x_a - x_r)}{8} = 2.875 + \frac{(11 - 3)}{8} = 2.875 + \frac{8}{8} = 3.875$$

Operations in this step: 1 division, 1 addition, 1 subtraction

2. Use equation 419 to iteratively calculate $SSD_3$ for the 3$^{rd}$ iteration:

$$SSD_3 = SSD_2 + \left((x_a + x_r - (\bar{x}_3 + \bar{x}_2))(x_a - x_r)\right) = 154.875 + \left((11 + 3 - (3.875 + 2.875))(11 - 3)\right) = 154.875 + \left((14 - 6.75)(8)\right) = 212.875$$

Operations in this step: 1 multiplication, 3 additions, 2 subtractions

3. Use equation 420 to calculate the sample variance $vs_3$ for the 3$^{rd}$ iteration:

$$vs_3 = \frac{SSD_3}{8-1} = \frac{212.875}{7} = 30.41071428571429$$

Operations in this step: 1 division, 1 subtraction

4. Use equation 422 to calculate the sample standard deviation $s_3$ for the 3$^{rd}$ iteration:

$$s_3 = \sqrt[2]{vs_3} = \sqrt[2]{30.41071428571429} = 5.514591035218685$$

Operations in this step: 1 square root

There are a total of 2 divisions, 1 multiplication, 4 additions and 4 subtractions when calculating the sample variance and with additionally 1 square root when calculating the sample standard deviation.

Fig. 5C Cont'd 2

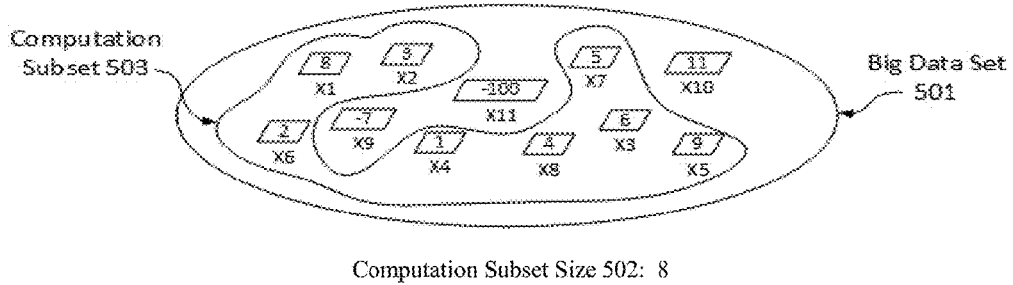

Computation Subset Size 502: 8

<u>Calculate Sample Variance and Sample Standard Deviation for Computation Subset 503</u>

Iterative Algorithm 3:

1. Use equation 402 to calculate $\bar{x}_1$ of computation subset 502 for the 1ˢᵗ iteration:

$$\bar{x}_1 = \frac{8+3+6+1+9+2+5+4}{8} = \frac{38}{8} = 4.75$$

Operations in this step: 1 division, 7 additions

2. Use equation 424 to calculate $SS_1 = \sum_1^8 x_i^2$ for the 1ˢᵗ iteration:

$$SS_1 = \sum_1^8 x_i^2 = 8^2 + 3^2 + 6^2 + 1^2 + 9^2 + 2^2 + 5^2 + 4^2 = 64 + 9 + 36 + 1 + 81 + 4 + 25 + 16 = 236$$

Operations in this step: 8 multiplications, 7 additions

3. Use equation 427 to calculate the sample variance $vs_1$ for the 1ˢᵗ iteration:

$$vs_1 = \frac{SS_1 - 8 \times \bar{x}_1^2}{8-1} = \frac{236 - 8 \times 4.75^2}{7} = \frac{236 - 8 \times 22.5625}{7} = \frac{236 - 180.5}{7} = 7.928571428571429$$

Operations in this step: 1 division, 2 multiplications, 2 subtractions

4. Use equation 429 to calculate the sample standard deviation $s_1$ for the 1ˢᵗ iteration:

$$s_1 = \sqrt[2]{vs_1} = \sqrt[2]{7.928571428571429} = 2.815771906346718$$

Operations in this step: 1 square root

There are a total of 2 divisions, 10 multiplications, 14 additions and 2 subtractions when calculating the sample variance and with additionally 1 square root when calculating the sample standard deviation.

Fig. 5D

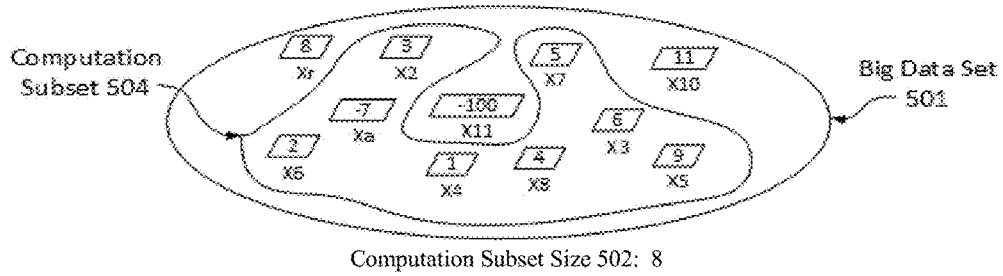

Computation Subset Size 502: 8

Calculate Sample Variance and Sample Standard Deviation for Computation Subset 504

Iterative Algorithm 3:

1. Use equation 414 to iteratively calculate $\bar{x}_2$ for the 2$^{nd}$ iteration:

$$\bar{x}_2 = \bar{x}_1 + \frac{(x_a - x_r)}{8} = 4.75 + \frac{(-7-8)}{8} = 4.75 - \frac{15}{8} = 2.875$$

Operations in this step: 1 division, 1 addition, 1 subtraction

2. Use equation 426 to iteratively calculate $SS_2$ for the 2$^{nd}$ iteration:

$$SS_2 = SS_1 + x_a^2 - x_r^2 = 236 + (-7)^2 - 8^2 = 236 + 49 - 64 = 221$$

Operations in this step: 2 multiplications, 1 addition, 1 subtraction

3. Use equation 427 to calculate the sample variance $vs_2$ for the 2$^{nd}$ iteration:

$$vs_2 = \frac{SS_2 - 8 \times \bar{x}_2^2}{8-1} = \frac{221 - 8 \times 2.875^2}{7} = \frac{221 - 8 \times 8.265625}{7} = 22.125$$

Operations in this step: 1 division, 2 multiplications, 2 subtractions

4. Use equation 429 to calculate the sample standard deviation $s_2$ for the 2$^{nd}$ iteration:

$$s_2 = \sqrt[2]{vs_2} = \sqrt[2]{22.125} = 4.703721930556695$$

Operations in this step: 1 square root

There are a total of 2 divisions, 4 multiplications, 2 additions and 4 subtractions when calculating the sample variance and with additionally 1 square root when calculating the sample standard deviation.

Fig. 5D Cont'd 1

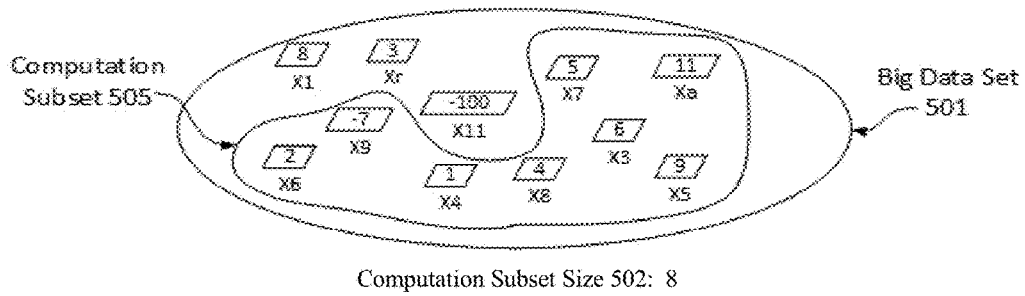

Computation Subset Size 502: 8

<u>Calculate Sample Variance and Sample Standard Deviation for Computation Subset 505</u>

Iterative Algorithm 3:

1. Use equation 414 to iteratively calculate $\bar{x}_3$ for the 3$^{rd}$ iteration:

$$\bar{x}_3 = \bar{x}_2 + \frac{(x_a - x_r)}{8} = 2.875 + \frac{(11-3)}{8} = 2.875 + \frac{8}{8} = 3.875$$

Operations in this step: 1 division, 1 addition, 1 subtraction

2. Use equation 426 to iteratively calculate $SS_3$ for the 3$^{rd}$ iteration:

$$SS_3 = SS_2 + x_a^2 - x_r^2 = 221 + 11^2 - 3^2 = 333$$

Operations in this step: 2 multiplications, 1 addition, 1 subtraction

3. Use equation 427 to calculate the sample variance $vs_3$ for the 3$^{rd}$ iteration:

$$vs_3 = \frac{SS_3 - 8 \times \bar{x}_3^2}{8-1} = \frac{333 - 8 \times 3.875^2}{7} = \frac{333 - 8 \times 15.015625}{7} = 30.41071428571429$$

Operations in this step: 1 division, 2 multiplications, 2 subtractions

4. Use equation 429 to calculate the sample standard deviation $s_3$ for the 3$^{rd}$ iteration:

$$s_3 = \sqrt[2]{vs_3} = \sqrt[2]{30.41071428571429} = 5.514591035218685$$

Operations in this step: 1 square root

There are a total of 2 divisions, 4 multiplications, 2 additions and 4 subtractions when calculating the sample variance and with additionally 1 square root when calculating the sample standard deviation.

Fig. 5D Cont'd 2

|  | Division | Multiplication | Addition | Subtraction |
|---|---|---|---|---|
| Traditional Algorithm | 2 | 8 | 14 | 9 |
| Iterative Algorithm 1 | 2 | 1 | 4 | 4 |
| Iterative Algorithm 2 | 2 | 1 | 4 | 4 |
| Iterative Algorithm 3 | 2 | 4 | 2 | 4 |

|  | Division | Multiplication | Addition | Subtraction |
|---|---|---|---|---|
| Traditional Algorithm | 2 | 1,000,000 | 1,999,998 | 1,000,001 |
| Iterative Algorithm 1 | 2 | 1 | 4 | 4 |
| Iterative Algorithm 2 | 2 | 1 | 4 | 4 |
| Iterative Algorithm 3 | 2 | 4 | 2 | 4 |

|  | Square Root | Division | Multiplication | Addition | Subtraction |
|---|---|---|---|---|---|
| Traditional Algorithm | 1 | 2 | 8 | 14 | 9 |
| Iterative Algorithm 1 | 1 | 2 | 1 | 4 | 4 |
| Iterative Algorithm 2 | 1 | 2 | 1 | 4 | 4 |
| Iterative Algorithm 3 | 1 | 2 | 4 | 2 | 4 |

|  | Square Root | Division | Multiplication | Addition | Subtraction |
|---|---|---|---|---|---|
| Traditional Algorithm | 1 | 2 | 1,000,000 | 1,999,998 | 1,000,001 |
| Iterative Algorithm 1 | 1 | 2 | 1 | 4 | 4 |
| Iterative Algorithm 2 | 1 | 2 | 1 | 4 | 4 |
| Iterative Algorithm 3 | 1 | 2 | 4 | 2 | 4 |

ITERATIVE VARIANCE AND/OR STANDARD DEVIATION CALCULATION FOR BIG DATA USING COMPONENTS

CROSS-REFERENCE TO RELATED APPLICATIONS

This application claims the benefit of provisional patent application Ser. No. 62/089,257, filed 2014 Dec. 9 by the present inventor.

BACKGROUND AND RELEVANT ART

Internet, mobile communications, navigation, online gaming, sensing technologies and large scale computing infrastructures are producing large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently and promptly process and analyze Big Data presents a difficult challenge to data analysts and computer scientists.

Processing Big Data can include performing calculations on multiple data elements. When performing statistical calculations on Big Data elements, the number of data elements to be accessed could be quite large. For example, when calculating a variance and/or a standard deviation a (potentially large) number of data elements may need to be accessed.

Further, some statistical calculations are recalculated after some data changes in a Big Data set. Thus, the (potentially large) number of data elements may be repeatedly accessed. For example, it may be that a variance and/or standard deviation is calculated for a computation subset that includes n data elements of a Big Data set stored in storage media. As such, every time two data elements are accessed or received, one of the accessed or received elements is added to the computation subset and the other data element is removed from the computation subset. The n data elements in the computation subset are then accessed to recalculate the variance and/or the standard deviation.

As such, each data change in the computation subset might only changes a small portion of the computation subset. Using all data elements in the computation subset to recalculate a variance and/or a standard deviation involves redundant data access and computation, and thus is time consuming and is an inefficient use of resources.

Depending on necessity, the computation subset size n could be extremely large, so the data elements in a computation subset could be distributed over a cloud comprising hundreds of thousands of computing devices. Re-performing variance and/or standard deviation calculations on Big Data sets after some data changes in traditional ways results in slow response and significant waste of computing resources.

BRIEF SUMMARY

The present disclosure describes methods, systems, and computing system program products for iteratively calculating variance and/or standard deviation for Big Data. A system comprising one or more computing devices includes one or more storage media that have stored a Big Data set. A computation subset size indicates a specified number n (n>1) of data elements in a computation subset. The computation subset, a subset of the Big Data set, contains the data elements involved in a variance and/or a standard deviation calculation. Iteratively calculating a variance and/or a standard deviation for a modified computation subset includes iteratively calculating one or more (p (p≥1)) components of the variance and/or the standard deviation for the modified computation subset based on one or more components of a variance and/or a standard deviation for a previous computation subset and then calculating the variance and/or the standard deviation using one or more iteratively calculated components. Iteratively calculating the components of variance and/or standard deviation avoids visiting all data elements in the modified computation subset and performing redundant computations thereby increasing calculation efficiency, saving computing resources and reducing computing system's power consumption.

The computing system initializes one or more (v(1≤v≤p)) components of a variance and/or a standard deviation for a computation subset of a specified size n (n>1). The initialization of the one or more components comprises calculating the one or more components through their definitions based on the data elements in the computation subset or accessing or receiving pre-calculated one or more components from one or more computing-device-readable media.

The computing system accesses a data element to be removed from the computation subset and a data element to be added to the computation subset. The computing system modifies the computation subset by removing the to-be-removed data element from the computation subset and adding the to-be-added data element to the computation subset.

The computing system directly iteratively calculating v(1≤v≤p) components for the modified computation subset. Directly iteratively calculating the v components of a variance and/or a standard deviation includes directly iteratively calculating each of the v components one by one. Directly iteratively calculating a component includes: accessing the component calculated for the previous computation subset; removing any contribution of the removed data element from the component mathematically; adding a contribution of the added data element to the component mathematically.

The computing system indirectly iteratively calculating w=p−v components as needed: indirectly iteratively calculating the w components includes indirectly iteratively calculating each of the w components one by one. Indirectly iteratively calculating a component includes calculating the component using one or more components other than the component itself. The one or more components may have been initialized, directly iteratively calculated or indirectly iteratively calculated.

The computing system generates a variance and/or a standard deviation as needed based on one or more iteratively calculated components of a variance and/or a standard deviation.

The computing system may keep accessing an existing data element to be removed from the computation subset and a data element to be added to the computation subset, modifying the computation subset, directly iteratively calculating v (1≤v≤p) components, indirectly iteratively calculating w=p−v components, and generating a variance and/or a standard deviation based on the one or more iteratively calculated components as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates traditional equations for calculating a sample variance, a population variance, a sample standard deviation and a population standard deviation respectively in a computation subset.

FIG. 4B illustrates some example components of a variance and/or a standard deviation, which may be used for iteratively calculating the variance and/or the standard deviation in a computation subset. FIG. 4B also illustrates a few basic iterative component calculation equations.

FIG. 4C illustrates the first example iterative variance and/or standard deviation calculation algorithm (iterative algorithm 1) and its equations for iteratively calculating a sample variance based on components $\bar{x}_{k+1}$ or $S_{k+1}$ and sample variance, a sample standard deviation based on iteratively calculated sample variance, a population variance based on components $\bar{x}_{k+1}$ or $S_{k+1}$ and population variance, and a population standard deviation based on iteratively calculated population variance.

FIG. 4D illustrates the second example iterative variance and/or standard calculation algorithm (iterative algorithm 2) and its equations for iteratively calculating a sample variance, a population variance, a sample standard deviation and a population standard deviation respectively in a computation subset based on iteratively calculated $$\sum_{1}^{n}(x_i - \bar{x}_{k+1})^2 + (x_a - \bar{x}_{k+1})^2 - (x_r - \bar{x}_{k+1})^2$$

Figure 1:
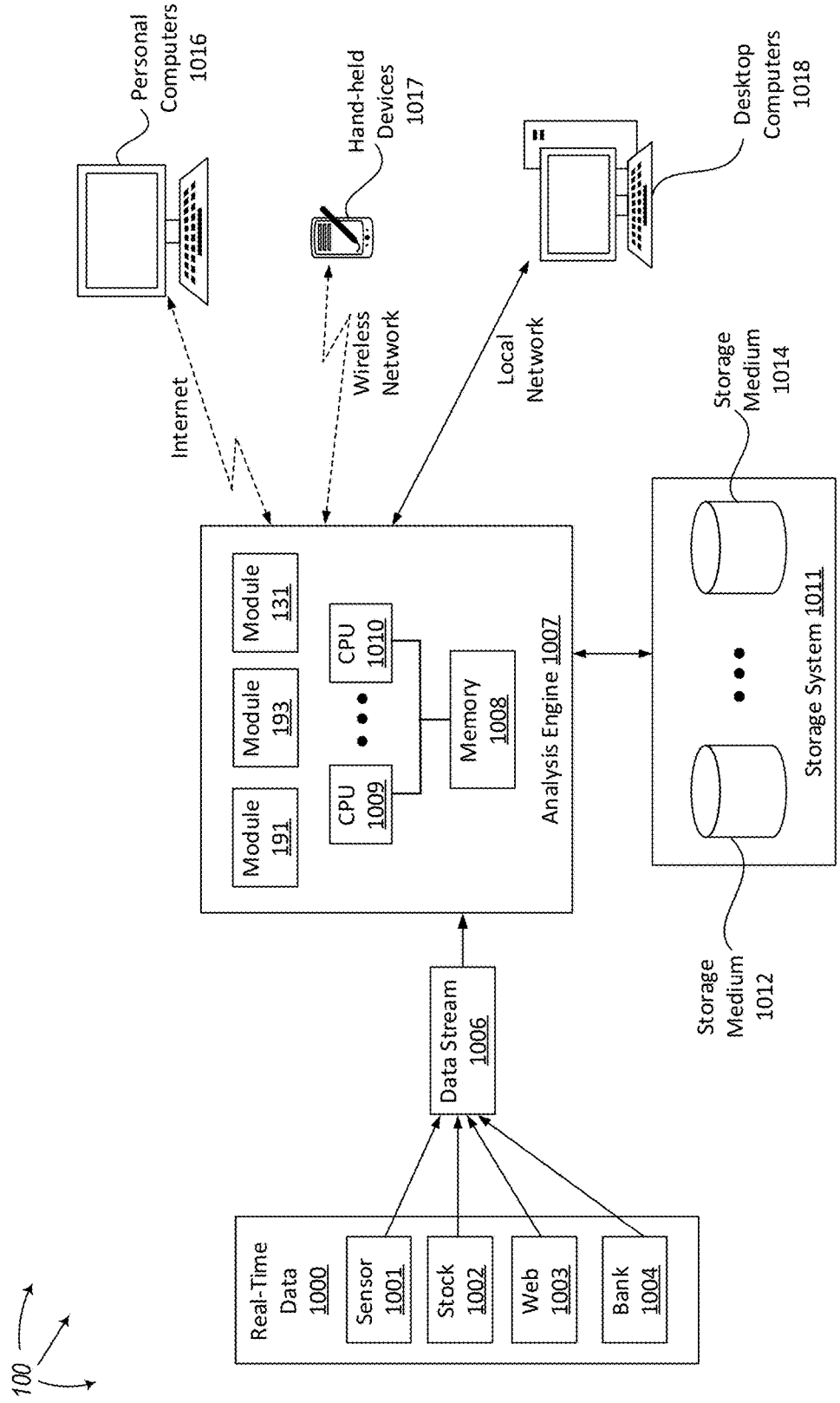
FIG. 1 illustrates a high-level overview of an example computing system that facilitates iteratively calculating variance and/or standard deviation for Big Data.

and mean $\bar{x}_{+1}$.

FIG. 4E illustrates the third example iterative variance and/or standard calculation algorithm (iterative algorithm 3) and its equations for iteratively calculating a sample variance, a population variance, a sample standard deviation and a population standard deviation respectively in a computation subset based on iteratively calculated $$\sum_{1}^{n} x_i^2 + x_a^2 - x_r^2$$

and mean $\bar{x}_{k+1}$.

FIG. 5A illustrates an example of calculating sample variance and sample standard deviation using traditional algorithms as shown in FIG. 4A.

FIG. 5B illustrates an example of calculating sample variance and sample standard deviation using iterative algorithm 1 as shown in FIG. 4C.

FIG. 5C illustrates an example of calculating sample variance and sample standard deviation using iterative algorithm 2 as shown in FIG. 4D.

FIG. 5D illustrates an example of calculating sample variance and sample standard deviation using iterative algorithm 3 as shown in FIG. 4E.

FIG. 6 illustrates computational loads for traditional variance calculation algorithms and iterative variance calculation algorithms with a computation subset of size 8.

FIG. 7 illustrates computational loads for traditional variance calculation algorithms and example iterative variance calculation algorithms with a computation subset of size 1,000,000.

FIG. 8 illustrates computational loads for traditional standard deviation calculation algorithms and example iterative standard deviation calculation algorithms with a computation subset of size 8.

FIG. 9 illustrates computational loads for traditional standard deviation calculation algorithms and example iterative standard deviation calculation algorithms with a computation subset of size 1,000,000.

DETAILED DESCRIPTION

The present disclosure describes methods, systems, and computing system program products for iteratively calculating variance and standard deviation for Big Data. A system comprising one or more computing devices includes one or more storage media that have stored a Big Data set. A computation subset size indicates a specified number n (n>1) of data elements in a computation subset. The computation subset, a subset of the Big Data set, contains the data elements involved in a variance and/or a standard deviation calculation. Iteratively calculating a variance and/or a standard deviation for a modified computation subset includes iteratively calculating one or more (p (p≥1)) components of the variance and/or the standard deviation for the modified computation subset based on one or more components of a variance and/or a standard deviation for a previous computation subset and then calculating the variance and/or the standard deviation using one or more iteratively calculated components. Iteratively calculating the components of variance and/or standard deviation avoids visiting all data elements in the modified computation subset and performing redundant computations thereby increasing calculation efficiency, saving computing resources and reducing computing system's power consumption.

As used herein, a variance of a random variable is a measure for the width of its distribution which describes how much its values disperse around the expected value. A standard deviation of a random variable is the square-root of the variance of the random variable and it is a measure for the scale of a distribution.

As used herein, a computation subset is a subset of a Big Data set which comprises the data elements involved in a variance and/or a standard deviation calculation. A computation subset is equivalent to a moving computation window when performing a variance and/or a standard deviation calculation on streamed data or time series data. Within the description of embodiments of the present invention, the difference between a computation window and a computation subset is that data elements in a computation window are ordered but that in a computation subset are not.

As used herein, a component of a variance is a quantity or expression appearing in the variance's definition equation or any transforms of the equation, and a component of a standard deviation is a quantity or expression appearing in the standard deviation's definition equation or any transforms of the equation. A variance comprises one or more components. A variance itself can be considered as the largest component of a variance. A standard deviation also comprises one or more components including the standard deviation itself. A variance can be calculated using its components. Similarly, a standard deviation can be calculated using its components. A standard deviation for a data set is the square root of a variance for the same data set, so they share some common components. Some example components of a variance and/or a standard deviation can be found in FIG. 4B.

A component may be either directly iteratively calculated or indirectly iteratively calculated. The difference between them is that when directly iteratively calculating a component, the component's value from previous iteration is used as a part of the calculation but when indirectly iteratively calculating a component, components other than itself are used.

For a given component, it might be directly iteratively calculated in one algorithm but indirectly iteratively calculated in another algorithm.

For a given algorithm, assume the total number of different components is p (p≥1), the number of directly iteratively calculated components is v (1≤v≤p), then the number of indirectly iteratively calculated components is w=p−v (0≤w<p). For any algorithm, there will be at least one component being directly iteratively calculated. It is possible that all components are directly iteratively calculated (in this case v=p and w=0). However, directly iteratively calculated components must be calculated in every iteration no matter if a variance and/or a standard deviation is accessed or not in a specific iteration.

For a given algorithm, if a component is directly iteratively calculated, then the component must be calculated in every iteration (i.e., whenever an existing data element is removed from and a data element is added to the computation subset). However, if a component is indirectly iteratively calculated, then the component only needs to be calculated as needed (i.e., when a variance and/or a standard deviation needs to be calculated and accessed). Thus, when a variance and/or a standard deviation are not accessed in a specific iteration, only a small number of components are iteratively calculated to save computation time. It should be understood that an indirectly iteratively calculated component may also be used in the calculation of a directly iteratively calculated component. In that case, the indirectly iteratively calculated component should also be calculated in every iteration.

Embodiments of the invention include iteratively calculating one or more (p (p≥1)) components of a variance and/or a standard deviation in a modified computation subset based on one or more (p (p≥1)) components calculated for a previous computation subset.

The computing system initializes one or more (v(1≤v≤p)) components of a variance and/or a standard deviation for a computation subset of a specified size n (n>1). The initialization of the one or more components comprises calculating the one or more components through their definitions based on the data elements in the computation subset or accessing or receiving pre-calculated one or more components from one or more computing-device-readable media.

The computing system accesses a data element to be removed from the computation subset and a data element to be added to the computation subset. The computing system modifies the computation subset by: removing the to-be-removed data element from the computation subset and adding the to-be-added data element to the computation subset.

The computing system directly iteratively calculating v(1≤v≤p) components for the modified computation subset. Directly iteratively calculating the v components of a variance and/or a standard deviation includes directly iteratively calculating each of the v components one by one. Directly iteratively calculating a component includes: accessing the component calculated for the previous computation subset; removing any contribution of the removed data element from the component mathematically; adding a contribution of the added data element to the component mathematically.

The computing system indirectly iteratively calculating w=p−v components as needed: indirectly iteratively calculating the w components includes indirectly iteratively calculating each of the w components one by one. Indirectly iteratively calculating a component includes calculating the component using one or more components other than the component itself (Depending on a specific algorithm used, calculating each of the w components may also need access to and use of the removed data element and/or the added data element). The one or more components may have been initialized, directly iteratively calculated or indirectly iteratively calculated.

The computing system generates a variance and/or a standard deviation as needed based on one or more iteratively calculated components of a variance and/or a standard deviation.

The computing system may keep accessing an existing data element to be removed from the computation subset and a data element from the data set to be added to the computation subset, modifying the computation subset, directly iteratively calculating v(1≤v≤p) components, indirectly iteratively calculating w=p−v components as needed, and generating a variance and/or a standard deviation as needed using one or more components, and the computing system may repeat this process for as many times as needed.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing device-readable media for carrying or storing computing device-executable instructions and/or data structures. Such computing device-readable media can be any available media that can be accessed by a general purpose or special purpose computing device. Computing device-readable media that store computing device-executable instructions are computing device storage media (devices). Computing device-readable media that carry computing device-executable instructions are transmission media. Thus, by way of example, and not limitation, embodiments of the invention can comprise at least two distinctly different kinds of computing device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing device-executable instructions or data structures and which can be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media can include a network and/or data links which may be used to carry desired program code means in the form of computing device-executable instructions or data structures and which can be accessed by a general purpose or special purpose computing device. Combinations of the above should also be included within the scope of computing device-readable media.

Further, upon reaching various computing device components, program code means in the form of computing device-executable instructions or data structures can be transferred automatically from transmission media to computing device storage media (devices) (or vice versa). For example, computing device-executable instructions or data structures received over a network or data link can be buffered in RAM within a network interface module (e.g., a "NIC"), and then eventually transferred to computing device RAM and/or to less volatile computing device storage media (devices) at a computing device. Thus, it should be understood that computing device storage media (devices) can be included in computing device components that also (or even primarily) utilize transmission media.

Computing device-executable instructions comprise, for example, instructions and data which, when executed at a processor, cause a general purpose computing device, special purpose computing device, or special purpose processing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Several examples will be given in the following sections.

FIG. 1 illustrates a high-level overview of an example computing system 100 that facilitates iteratively calculating variance and/or standard deviation for Big Data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, variance calculation module 191, standard deviation calculation module 193 and component calculation modules 131. Variance calculation module 191, standard deviation calculation module 193 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
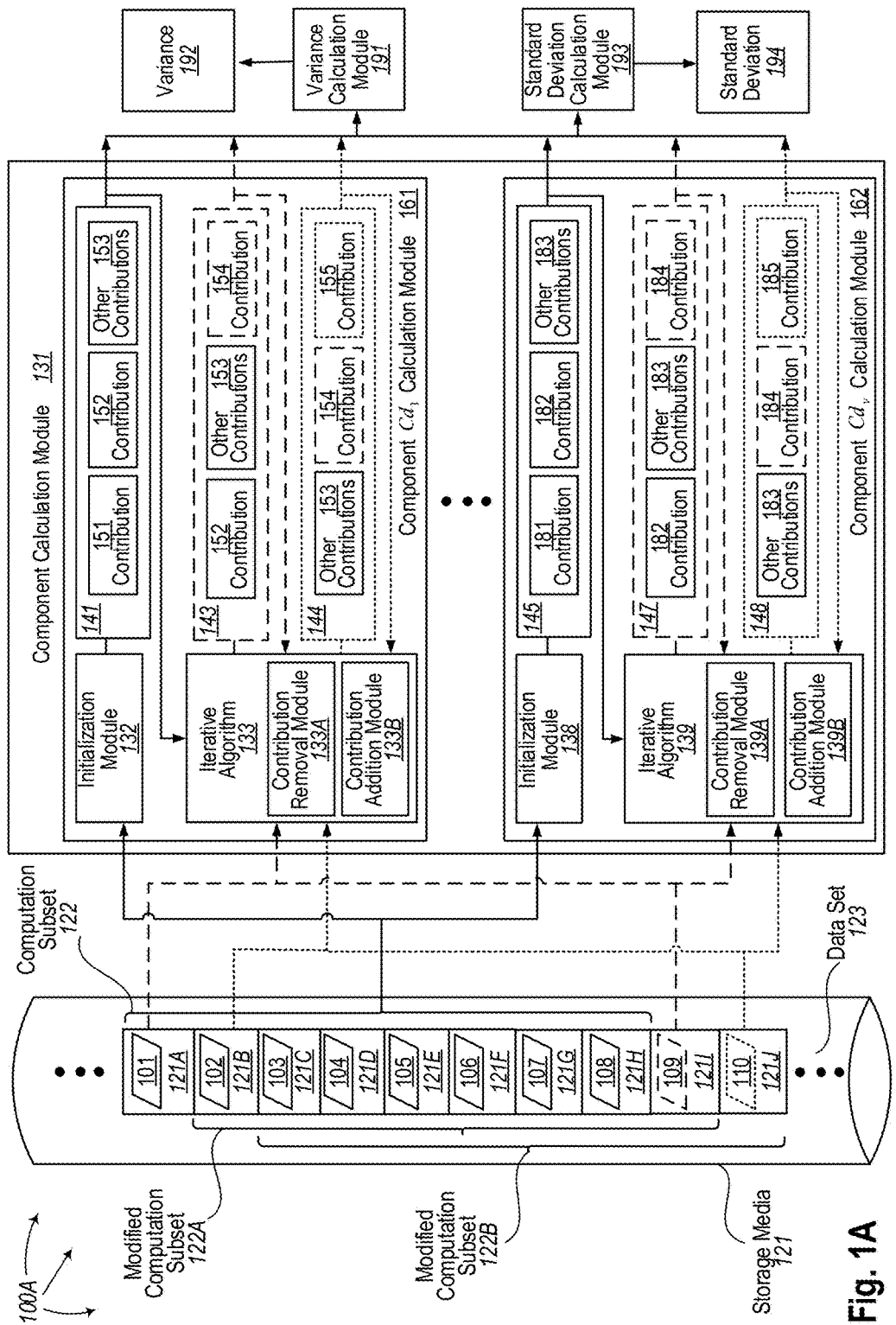
FIG. 1A illustrates an example computing system architecture that facilitates iteratively calculating variance and/or standard deviation for Big Data with all components being directly iteratively calculated.

FIG. 1A illustrates an example computing system architecture 100A that facilitates iteratively calculating a variance and/or standard deviation for Big Data with all components (p (p=v≥1)) being directly iteratively calculated, in other words v=p≥1 and w=0. FIG. 1A illustrates 1007 and 1006 shown in FIG. 1. Referring to FIG. 1A, computing system architecture 100A includes component calculation module 131, variance calculation module 191 and standard deviation calculation module 193. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. Accordingly, iterative component calculation module 131 as well as any other connected computing devices and their components, can send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 may be used as the input of variance calculation module 191, and variance calculation module 191 may generate variance 192. The output of component calculation module 131 may be used as the input of standard deviation calculation module 193, and standard deviation calculation module 193 may generate variance 194. Variance 192 may be either a sample variance or a population variance. Standard deviation 194 may be either a sample standard deviation or a population standard deviation.

In general, storage media 121 may be a single local storage medium and may also be a complex storage system that comprises multiple physically distributed storage devices managed by a storage management system.

Storage media 121 comprises a data set 123. In general, data set 123 may comprise different kinds of data, such as, for example, stock quotes, audio data, video data, geospatial data, web data, mobile communication data, online gaming data, banking transaction data, sensor data, and closed-captioning data, real time text, etc.

As depicted, data set 123 comprises multiple data elements stored in multiple locations of storage media 121. For example, data elements 101 is stored in location 121A, data element 102 is stored in location 121B, data element 103 is stored in location 121C, data element 104 is stored in location 121D, data element 105 is stored in location 121E, data element 106 is stored in location 121F, data element 107 is stored in location 121G, data element 108 is stored in location 121H, data element 109 is stored in location 121I, and data element 110 is stored in location 121J, etc., There are multiple data elements stored in other locations.

Assume that a variance and/or standard deviation calculation is started from computation subset 122. Computation subset 122 with a specified size of 8 (i.e., n=8) contains a portion of data set 123: data elements 101, 102, ..., and 108. All the data elements ranging from 101 to 108 in computation subset 122 may be accessed for initializing one or more components of the variance and/or standard deviation.

Next, data elements 101 and 109 may be accessed from locations 121A and 121I respectively. Data element 101 will be removed from computation subset 122, and data element 109 will be added to computation subset 122, then computation subset 122 becomes modified computation subset 122A. Modified computation subset 122A contains 8 data elements: 102, 103, ..., 109. The computing system may iteratively calculate a variance and/or a standard deviation for modified computation subset 122A.

Subsequently, data elements 102 and 110 may be accessed from locations 121B and 121J respectively. Data element 102 will be removed from modified computation subset 122A, and data element 110 will be added to modified computation subset 122A, then modified computation subset 122A becomes modified computation subset 122B. Modified computation subset 122B contains 8 data elements: 103, 103, ..., 110. The computing system may iteratively calculate a variance and/or a standard deviation for modified computation subset 122B.

More details about the example computing system architecture are provided below.

In general, component calculation module 131 comprises p component calculation modules for calculating p components for a set of n data elements in a computation subset. The number p varies depending on which iterative algorithm is used. As depicted in FIG. 1A, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and iterative algorithm 133 for iteratively calculating component $Cd_1$. Component $Cd_v$ calculation module 162 comprises initialization module 138 for initializing component $Cd_v$ and iterative algorithm 139 for iteratively calculating component $Cd_v$. Initialization module 132 is configured to calculate component $Cd_1$ for a set of n data elements in a computation subset and initialization module 138 is configured to calculate component $Cd_v$ for a set of n data elements in a computation subset. Component $Cd_1$ 141 and component $Cd_v$ 145 receive a full set of n data elements (e.g., n=8) from a computation subset as input. Initialization module 132 calculates component $Cd_1$ and initialization module 138 calculates component $Cd_v$ from the full set of n data elements. Thus, each data element contributes to the calculated components ranging from component $Cd_1$ to component $Cd_v$. Initialization module 132 may be used for an initial component $Cd_1$ calculation or when component $Cd_1$ calculations are reset. Similarly, initialization module 138 may be used for an initial component $Cd_v$ calculation or when component $Cd_v$ calculations are reset.

Iterative component algorithms are also configured to calculate components for a set of data elements in a computation subset. Iterative algorithm 133 accesses or receives a prior component $Cd_1$ value, a data element removed from the computation subset and a data element added to the computation subset as input. Iterative algorithm 133 calculates a new component $Cd_1$ based on the prior component $Cd_1$ value for the previous computation subset, the removed data element and the added data element. Contribution removal module 133A may remove a contribution of the removed data element from the prior component $Cd_1$. Contribution addition module 133B can add a contribution of the added data element to the prior component $Cd_1$. Removing a contribution of the removed data element along with adding a contribution of the added data element may be used for calculating component $Cd_1$ for the computation subset. Iterative algorithm 139 works in a similar way as iterative algorithm 133. Iterative algorithm 139 accesses or receives a prior component $Cd_v$ value for the previous computation subset, a data element to be removed from the computation subset and a data element to be added to the computation subset as input. Iterative algorithm 139 calculates a new component $Cd_v$ based on the prior component $Cd_v$ value, the removed data element and the added data element. Contribution removal module 139A can remove a contribution of the removed data element from the prior component $Cd_v$. Contribution addition module 139B can add a contribution of the added data element to the prior component $Cd_v$. Removing a contribution of the removed least recent data element along with adding a contribution of the added data element may be used for calculating component $Cd_v$ for the computation subset.

Referring to FIG. 1A, computing system architecture 100A also includes variance calculation module 191 and standard deviation calculation module 193. Once p (p=v≥1) components of a variance and/or a standard deviation are calculated by component calculation module 131, variance calculation module 191 may calculate the variance 192 as needed based on one or more iteratively calculated components, and standard deviation calculation module 193 may calculate the standard deviation 194 as needed based on one or more iteratively calculated components.

Referring to FIG. 1A, computing system architecture 100A also includes standard deviation calculation module 193. Once p (p=v≥1) components of a variance and/or a standard deviation are calculated by component calculation module 131, standard deviation calculation module 193 may calculate the standard deviation 194 as needed based on one or more iteratively calculated components. Standard deviation 194 may be either a sample standard deviation or a population standard deviation.

Figure 1B:
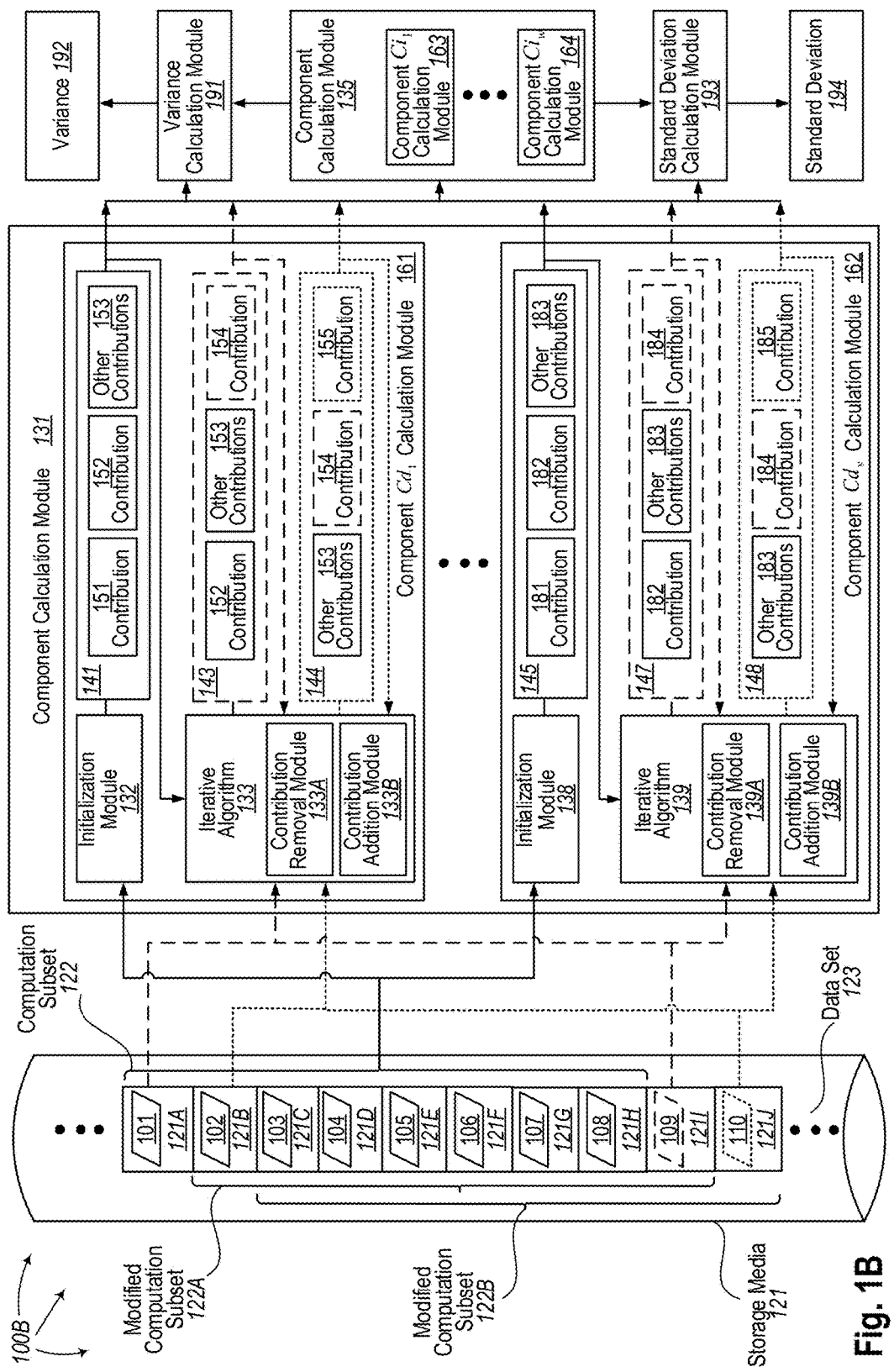
FIG. 1B illustrates an example computing system architecture that facilitates iteratively calculating variance and/or standard deviation for Big Data with some components being directly iteratively calculated and some components being indirectly iteratively calculated.

FIG. 1B illustrates an example computing system architecture 100B that facilitates iteratively calculating variance and standard deviation for Big Data with some (v(1≤v<p)) components being directly iteratively calculated and some (w=p−v(1≤w<p)) components being indirectly iteratively calculated. Both the number v and the number w are algorithm dependent. Many parts included in computing system architectures 100B and 100A have same reference numbers. Those parts have similar structures and work in similar ways. In certain implementations, the difference between the computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131 and 131 also includes v component calculation modules for directly iteratively calculating v components, however the number v in 100B may not be the same number v as in 100A, because some directly iteratively calculated components in 100A are indirectly iteratively calculated in 100B. In 100A, v=p≥1, but in 100B, 1≤v<p. Referring to FIG. 1B, computing system architecture 100B includes component calculation module 135. The output of components calculation module 131 may be used as the input of component calculation module 135, and the output of calculation modules 131 and 135 may be used as the input of variance calculation module 191, and variance calculation module 191 may generate variance 192. The output of calculation modules 131 and 135 may be used as the input of standard deviation calculation module 193, and standard deviation calculation module 193 may generate standard deviation 194. Component calculation module 135 generally includes w=p−v component calculation modules for indirectly iteratively calculating w components. For example, component calculation module 135 includes calculation module 163 for indirectly iteratively calculating component $Ci_1$ and calculation module 164 for indirectly iteratively calculating component $Ci_w$, and there are w−2 component calculation modules in between. Indirectly iteratively calculating w components includes indirectly iteratively calculating each of the w components one by one. Indirectly iteratively calculating a component includes accessing and using one or more components other than the component itself. The one or more components could be initialized, directly iteratively calculated or indirectly iteratively calculated. To save computation time, indirectly iteratively calculated components ranging from $Ci_1$ to $Ci_w$ can be calculated as needed, i.e., they may not need to be calculated in every iteration. In other words, they only need to be calculated when a variance and/or a standard deviation is accessed. However, directly iteratively calculated components ranging from $Cd_1$ to $Cd_v$ must be calculated in every iteration even variance and/or standard deviation is not accessed in every iteration.

Referring to computing system architecture 100B, once all p (p=v+w) components have been calculated, variance calculation module 191 may be used for calculating a variance 192 as needed based on one or more initialized or iteratively calculated components, and standard deviation calculation module 193 may be used for calculating a standard deviation 194 as needed based on one or more initialized or iteratively calculated components. Variance 192 may be either a sample variance or a population variance. Standard deviation 194 may be either a sample standard deviation or a population standard deviation.

Figure 2:
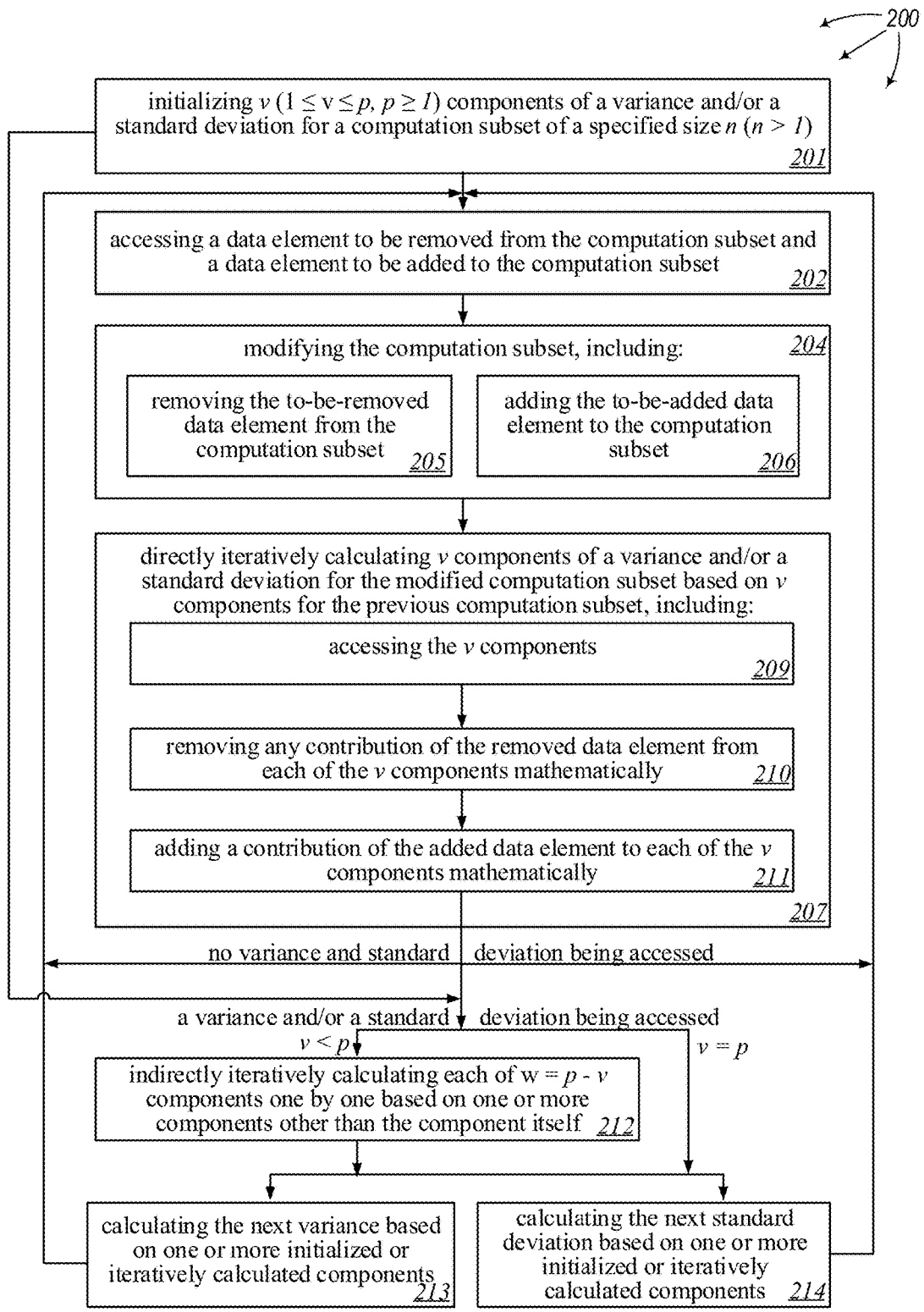
FIG. 2 illustrates a flow chart of an example method for iteratively calculating variance and/or standard deviation for Big Data.

FIG. 2 illustrates a flow chart of an example method 200 for iteratively calculating a variance and/or a standard deviation for Big Data. Method 200 will be described with respect to the components and data of computing system architectures 100A and 100B.

Method 200 includes initializing v (1≤v≤p, p≥1) components of a variance and/or a standard deviation for a computation subset of a specified size n (n>1) (201). For example, in computing system architecture 100A and computing system architecture 100B, computation subset size is initialized to be 8, and initialization module 132 may be used for initializing component $Cd_1$ 141 for computation subset 122 of size 8 which contains data elements 101, 102, 103, 104, 105, 106, 107 and 108. As depicted, component $Cd_1$ 141 includes contribution 151, contribution 152, and other contributions 153. Contribution 151 is a contribution from data element 101. Contribution 152 is a contribution from data element 102. Other contributions 153 are contributions from data elements 103, 104, 105, 106, 107 and 108. Similarly, initialization module 138 may be used for initializing component $Cd_v$ 145 for computation subset 122 of size 8 which contains data elements 101, 102, 103, 104, 105, 106, 107 and 108. As depicted, component $Cd_v$ 145 includes contribution 181, contribution 182, and other contributions 183. Contribution 181 is a contribution from data element 101. Contribution 182 is a contribution from data element 102. Other contributions 183 are contributions from data elements 103, 104, 105, 106, 107 and 108.

Method 200 includes accessing a data element to be removed from the computation subset and a data element to be added to the computation subset (202). For example, data element 101 and data element 109 may be accessed subsequent to accessing data elements 102-108, and data element 101 may be removed from and data element 109 may be added to modified computation subset 122A.

Method 200 includes modifying the computation subset (204). For example, computation subset 122 may become modified computation subset 122A. Modifying the computation subset includes removing the to-be-removed data element from the computation subset (205) and adding the to-be-added data element to the computation subset (206). For example, data element 101 is removed from and data element 109 is added to computation subset 122 which then becomes modified computation subset 122A.

Method 200 includes directly iteratively calculating v(1≤v≤p) components of a variance and/or a standard deviation for the modified computation subset based on v components for the previous computation subset (207). For example, iterative algorithm 133 may be used for directly iteratively calculating component $Cd_1$ 143 (for modified computation subset 122A) based on component $Cd_1$ 141 (for computation subset 122), and iterative algorithm 139 may be used for directly iteratively calculating component $Cd_v$ 147 (for modified computation subset 122A) based on component $Cd_1$ 145 (for computation subset 122).

Directly iteratively calculating v components of a variance and/or a standard deviation for the modified computation subset includes accessing the v components of a variance and/or a standard deviation in the modified computation subset (209). For example, iterative algorithm 133 may access component $Cd_1$ 141. Similarly, iterative algorithm 139 may access component $Cd_v$ 145.

Directly iteratively calculating v components of a variance and/or a standard deviation for the modified computation subset includes removing any contribution of the removed data element from each of the v components mathematically (210). For example, iteratively calculating component $Cd_1$ 143 may include contribution removal module 133A removing contribution 151 (i.e., the contribution from data element 101) from component $Cd_1$ 141 mathematically, and iteratively calculating component $Cd_v$ 147 can include contribution removal module 139A removing contribution 181 (i.e., the contribution from data element 101) from component $Cd_v$ 145 mathematically. Directly iteratively calculating v components of a variance and/or a standard deviation for the modified computation subset includes adding a contribution of the added data element to each of the v components mathematically (211). For example, iteratively calculating component $Cd_1$ 143 may include contribution addition module 133B adding contribution 154 to component $Cd_1$ 141 mathematically, and iteratively calculating component $Cd_v$ 147 can include contribution addition module 139B adding contribution 184 to component $Cd_v$ 145 mathematically. Contribution 154 and 184 are contributions of data element 109.

As depicted, component $Cd_1$ 143 includes contribution 152 (a contribution of data element 102), other contributions 153 (contributions of data elements 103-108), and contribution 154 (a contribution of data element 109). Similarly, component $Cd_v$ 147 includes contribution 182 (a contribution of data element 102), other contributions 183 (contributions of data elements 103-108), and contribution 184 (a contribution of data element 109).

Besides directly iteratively calculated components, some components may be indirectly iteratively calculated. When not all components are directly iteratively calculated (v<p), method 200 includes indirectly iteratively calculating w=p−v components one by one as needed based on one or more components other than the component itself (212). An indirectly iteratively calculated component may be calculated as needed by one or more components other than the component itself. Since the w indirectly iteratively calculated components are calculated using other components, they might not need to be initialized. In addition, the w indirectly iteratively calculated components might not need to be calculated in every iteration (i.e., an existing data element is removed from and a data element is added to the computation subset). They only need to be calculated when a variance and/or a standard deviation are accessed to save computation time. For example, referring to FIG. 1B where some components are directly iteratively calculated and some are indirectly iteratively calculated, calculation module 163 may indirectly iteratively calculate $Ci_1$ based on one or more components other than $Ci_1$, and calculation module 164 may indirectly iteratively calculate $Ci_w$ based on one or more components other than $Ci_w$. The one or more components may have been initialized, directly iteratively calculated, or indirectly iteratively calculated. The w components ranging from $Ci_1$ to $Ci_w$ only need to be calculated when a variance and/or a standard deviation are accessed. For a given component, it is possible that it is directly iteratively calculated in one algorithm but indirectly iteratively calculated in another algorithm. For example, referring to FIG. 4C, in Example Iterative Variance and Standard Deviation Calculation Algorithm 1, component $vs_{k+1}$ for the k+1$^{th}$ iteration is directly iteratively calculated based on component $vs_k$ for the k$^{th}$ iteration, other components, the data element added to the computation subset and the data element removed from the computation subset. However, referring to FIG. 4E, in Example Iterative Variance and Standard Deviation Calculation Algorithm 3, component $vs_{k+1}$ for the k+1$^{th}$ iteration is indirectly iteratively calculated based on components other than vs. For a given algorithm, directly iteratively calculated components must be calculated whenever there is a change in the computation subset (e.g., an existing data element is removed from and a data element is added to the computation subset), no matter if a variance and/or a standard deviation is accessed or not; however, an indirectly iteratively component only needs to be calculated as needed, i.e., when a variance and/or a standard deviation is accessed. For example, referring to FIG. 4E, in Example Iterative Variance and Standard Deviation Calculation Algorithm 3, component $vs_{k+1}$ only needs to be calculated when a sample variance $vs_{k+1}$ is accessed or a sample standard deviation $s_{k+1}$ is accessed.

Variance calculation module 191 may then calculate variance 192 as needed based on the one or more initialized or iteratively calculated components, for example, component $Cd_1$ 143 and component $Cd_v$ 147 (213). Variance 192 may be either a sample variance or a population variance.

Standard deviation calculation module 193 may then calculate standard deviation 194 as needed based on the one or more initialized or iteratively calculated components, for example, component $Cd_1$ 143 and component $Cd_v$ 147 (214). Standard deviation 194 may be either a sample standard deviation or a population standard deviation.

202-211 may be repeated as additional data elements are accessed. 212-214 may be repeated as needed. For example, subsequent to calculating components ranging from $Cd_1$ 143 to $Cd_v$ 147, data element 102 and date element 110 may be accessed (202). Data element 102 and data element 110 may be accessed from locations 121B and 121J respectively. Modified computation subset 122A may become modified computation subset 122B (204) by removing data element 102 (205) and adding data element 110 (206).

Iterative algorithm 133 may be used for directly iteratively calculating component $Cd_1$ 144 (for modified computation subset 122B) based on component $Cd_1$ 143 (for modified computation subset 122A) (207). Iterative algorithm 133 may access component $Cd_1$ 143 (209). Iteratively calculating component $Cd_1$ 144 may include contribution removal module 133A removing contribution 152 (i.e., the contribution from data element 102) from component $Cd_1$ 143 mathematically (210). Iteratively calculating component $Cd_1$ 144 can include contribution addition module 133B adding contribution 155 to component $Cd_1$ 143 mathematically (211). Contribution 155 is a contribution of data element 110.

Similarly, iterative component $Cd_v$ algorithm 139 may be used for directly iteratively calculating component $Cd_v$ 148 (for modified computation subset 122B) based on component $Cd_v$ 147 (for modified computation subset 122A) (207). Iterative component $Cd_v$ algorithm 139 may access component $Cd_v$ 147 (209). Iteratively calculating component $Cd_v$ 148 may include contribution removal module 139A removing contribution 182 (i.e., the contribution from data element 102) from component $Cd_v$ 147 mathematically (210). Iteratively calculating component $Cd_v$ 148 may include contribution addition module 139B adding contribution 185 to component $Cd_v$ 147 mathematically (211). Contribution 185 is a contribution of data element 110.

As depicted, component $Cd_1$ 144 includes other contributions 153 (contributions of data elements 103-108), contribution 154 (a contribution of data element 109), and contribution 155 (a contribution of data element 110), and component $Cd_v$ 148 includes other contributions 183 (contributions of data elements 103-108), contribution 184 (a contribution of data element 109), and contribution 185 (a contribution of data element 110).

Some components may be directly iteratively calculated (209, 210 and 211) and some components may be indirectly iteratively calculated (212). For example, referring to FIG. 1B, calculation module 163 may indirectly iteratively calculate $Ci_1$ based on component $Cd_1$ and two other directly iteratively calculated components, and calculation module 164 may indirectly iteratively calculate $Ci_w$ based on directly iteratively calculated component $Cd_v$, indirectly iteratively calculated component $Ci_1$ and the input data elements.

Variance calculation module 191 may then calculate variance 192 based on the one or more iteratively calculated components, for example, component $Cd_1$ 144 and component $Cd_v$ 148 (213). Variance 192 may be either a sample variance or a population variance.

Standard deviation calculation module 193 may then calculate standard deviation 194 based on the one or more iteratively calculated components, for example, component $Cd_1$ 144 and component $Cd_v$ 148 (214). Standard deviation 194 may be either a sample standard deviation or a population standard deviation.

When a next data element is accessed, component $Cd_1$ 144 may be used for directly iteratively calculating a component $Cd_1$ for the modified computation subset and component $Cd_v$ 148 may be used for directly iteratively calculating a component $Cd_v$ for the modified computation subset.

Figure 3B:
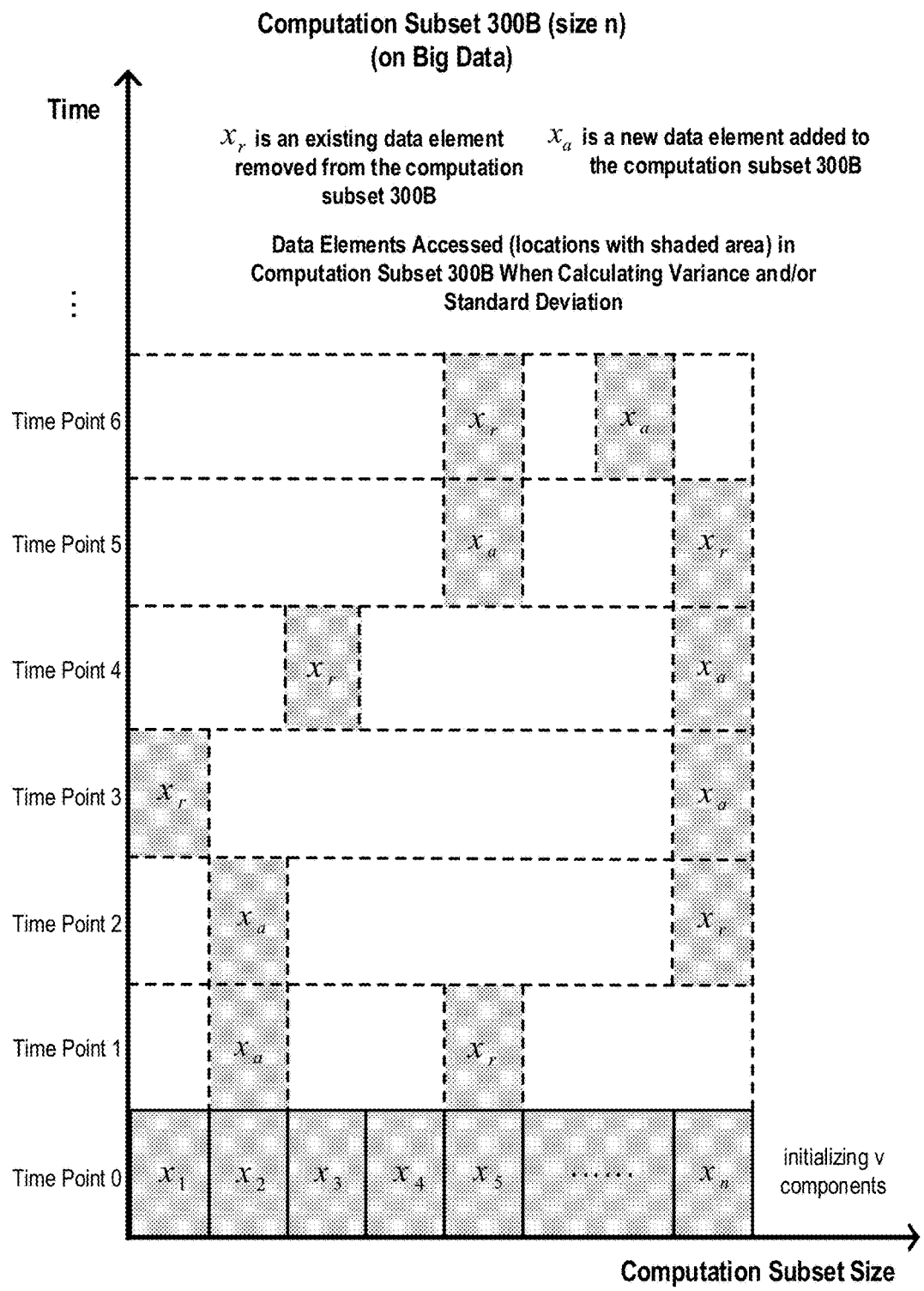
FIG. 3B illustrates the data elements that are accessed from a computation subset for iteratively calculating a variance and/or a standard deviation on Big Data.

FIG. 3B illustrates data that is accessed from a computation subset 300B for iteratively calculating a variance and/or a standard deviation on Big Data. The difference between a computation subset and a computation window is that the data elements in a computation subset are not ordered (e.g., an existing data element may be removed from any position of a computation subset and a data element may be added to any position of the computation subset). For example, referring to FIG. 3B, an existing data element may be removed from any position (indicated by letter "r") of computation subset 300B and a newly accessed data element may be added to any position (indicated by letter "a") of computation subset 300B. For computation subset 300B, when initializing v components of a variance and/or a standard deviation, the first n data elements might be accessed for calculating v components of a variance and/or a standard deviation for the first computation subset. As time progresses, an existing data element removed from the computation subset 300B and a data element added to the computation subset 300B, are accessed for directly iteratively calculating v components for the modified computation subset, indirectly iteratively calculating w=p−v components, and calculating the variance and/or the standard deviation using one or more iteratively calculated components. The v components may be directly iteratively calculated from the removed data element, the added data element and the v components for the previous computation subset. For a given iterative algorithm, v is a constant, so the number of operations for directly iteratively calculating v components is a constant, and the number of operations for indirectly iteratively calculating w=p−v components is also a constant. Thus, after calculation of the p components for the first computation subset, computation workload is reduced and remains constant. The larger the n, the more substantial the reduction in computation workload.

FIG. 4A illustrates the definition of a variance and a standard deviation respectively and equations for calculating a variance and a standard deviation. Suppose a computation subset $X=\{x_i | i=1, \ldots, n\}$ is a subset of a Big Data set which comprises the data elements to be involved in a variance and/or a standard deviation calculation. Equation 401 is a traditional equation for calculating a sum of all the data elements in computation subset X. Equation 402 is a traditional equation for calculating a mean of all the data elements in computation subset X. Equation 403 is a traditional equation for calculating a sample variance for the computation subset X. Equation 404 is a traditional equation for calculating a population variance for the computation subset X. Equation 405 is a traditional equation for calculating a sample standard deviation for the computation subset X. Equation 406 is a traditional equation for calculating a population standard deviation for the computation subset X. Assuming the computation subset X of size n is changed with a data element $x_r$ ($1 \leq r \leq n$) being removed and a data element $x_a$ being added. Define the modified computation subset as X'. Equation 407 is a traditional equation for calculating a sum of all the data elements in the modified computation subset X'. Equation 408 is a traditional equation for calculating a mean of all the data elements in the modified computation subset X'. Equation 409 is a traditional equation for calculating a sample variance for the modified computation subset X'. Equation 410 is a traditional equation for calculating a population variance for the modified computation subset X'. Equation 411 is a traditional equation for calculating a sample standard deviation for the modified computation subset X'. Equation 412 is a traditional equation for calculating a population standard deviation for the modified computation subset X'.

FIG. 4B illustrates some example components of a variance and a standard deviation and basic iterative component calculation equations. A component is a quantity or expression appearing in a variance's and a standard deviation's equations or any transforms of the equations. The following are a few examples of components of a variance and a standard deviation.

$$vs_k = \frac{1}{n-1}\sum_1^n (x_i - \bar{x}_k)^2$$

for a sample variance and a sample standard deviation $$vp_k = \frac{1}{n}\sum_1^n (x_i - \bar{x}_k)^2$$

for a population variance and a population standard deviation $$SSD_k = \sum_1^n (x_i - \bar{x}_k)^2, \; S_k = \sum_1^n x_i, \; \bar{x}_k = \frac{1}{n}\sum_1^n x_i \text{ and } SS_k = \sum_1^n x_i^2$$

for a sample variance, a sample standard deviation, a population variance and a population standard deviation $$s_k = \sqrt{\frac{1}{n-1}\sum_1^n (x_i - \bar{x}_k)^2}$$

for a sample standard deviation $$\sigma_k = \sqrt{\frac{1}{n}\sum_1^n (x_i - \bar{x}_k)^2}$$

for a population standard deviation
For example, $$\frac{1}{n-1}\sum_1^n (x_i - \bar{x}_k)^2$$

may be considered as a component for a sample variance and a sample standard deviation, $$\frac{1}{n}\sum_1^n (x_i - \bar{x}_k)^2$$

may be considered as a component for a population variance and a population standard deviation, and $$\sum_1^n (x_i - \bar{x}_k)^2, \; \frac{1}{n}\sum_1^n x_i \text{ and } \sum_1^n x_i^2$$

may be considered as components for a sample variance, a sample standard deviation, a population variance and a population standard deviation. A variance and/or a standard deviation may be calculated based on one or more components or combinations of them, so there are multiple algorithms supporting iterative variance and/or standard deviation calculation. To illustrate how to use components to iteratively calculate variance and/or standard deviation, three different iterative variance and/or standard deviation calculation algorithms are given as examples. A new iteration of calculation is started each time there is a data change in the computation subset (e.g., 122→122A→122B). A sum $$\sum_1^n x_i$$

or a mean $$\frac{1}{n}\sum_1^n x_i$$

is the basic component to be used for calculating a variance and/or a standard deviation, so an equation for iteratively calculating a sum and a mean respectively is illustrated in FIG. 4B. Equation 413 may be used for iteratively calculating a sum of all the data elements in the modified computation subset X'. Equation 414 may be used for iteratively calculating a mean of all the data elements in the modified computation subset X'. Either a sum or a mean will be used in all three iterative variance and/or standard deviation calculation algorithms described later.

FIG. 4C illustrates the first example iterative variance and/or standard deviation calculation algorithm (iterative algorithm 1) for iteratively calculating a sample variance and a sample standard deviation based on iteratively calculated sample variance and iteratively calculating a population variance and a population standard deviation based on iteratively calculated population variance. Equation 413 may be used for directly iteratively calculating component $S_{k+1}$ if component $S_k$ is available. Equation 414 may be used for directly iteratively calculating component $\bar{x}_{k+1}$ if component $\bar{x}_k$ is available. Equation 415 may be used for directly iteratively calculating a sample variance $vs_{k+1}$ on the computation subset X' using components $vs_k$, $S_k$ and $S_{k+1}$ or $\bar{x}_k$ and $\bar{x}_{k+1}$ once they are calculated. Equation 416 may be used for indirectly iteratively calculating sample standard deviation $s_{k+1}$ once components $\bar{x}_{k+1}$ or $vs_{k+1}$ is calculated. Equation 417 may be used for directly iteratively calculating population variance $vp_{k+1}$ on the computation subset X' based on components $vp_k$, $S_k$ and $S_{k+1}$ or $\bar{x}_k$ and $\bar{x}_{k+1}$ once they are calculated. Equation 418 may be used for indirectly iteratively calculate population standard deviation $\sigma_{k+1}$ once component $\bar{x}_{+1}$ or $vp_{k+1}$ is calculated.

FIG. 4D illustrates the second example iterative variance and/or standard deviation calculation algorithm (iterative algorithm 2) for iteratively calculating a sample variance, a population variance, a sample standard deviation and a population standard deviation based on iteratively calculated components $S_{k+1}$ or $\bar{x}_{+1}$ and $SSD_{k+1}$. Equation 413 may be used for directly iteratively calculating component $S_{k+1}$ if component $S_k$ is available. Equation 414 may be used for directly iteratively calculating component $\bar{x}_{k+1}$ if component $\bar{x}_k$ is available. Equation 419 may be used for iteratively calculating $SSD_{k+1}$ once components $S_{k+1}$ or $\bar{x}_{k+1}$ and $SSD_k$ are calculated. Equation 420 can be then used for indirectly iteratively calculating sample variance $vs_{k+1}$. Equation 421 may be used for indirectly iteratively calculating population variance $vp_{k+1}$. Equation 422 may be used for indirectly iteratively calculating sample standard deviation $s_{k+1}$. Equation 423 may be used for indirectly iteratively calculating population standard deviation $\sigma_{k+1}$.

FIG. 4E illustrates the third example iterative variance and/or standard deviation calculation algorithm (iterative algorithm 3) for iteratively calculating a sample variance, a population variance, a sample standard deviation and a population standard deviation based on iteratively calculated components $\bar{x}_{k+1}$ and $SS_{k+1}$. Equation 413 may be used for directly iteratively calculating component $S_{k+1}$ if component $S_k$ is available. Equation 414 may be used for directly iteratively calculating component $\bar{x}_{k+1}$ if component $\bar{x}_k$ is available. Equation 424 is a traditional equation for calculating component $SS_k$ in the computation subset X. Equation 425 is a traditional equation for calculating component $SS_{k+1}$ in the modified computation subset X'. Equations 426 may be used for directly iteratively calculating component $SS_{k+1}$ in the modified computation subset X' if component $SS_k$ is available. Equation 427 may be then used for indirectly iteratively calculating sample variance $vs_{k+1}$ based on components $S_{k+1}$, or $\bar{x}_{k+1}$, or $S_{k+1}$ and $\bar{x}_{k+1}$, and $SS_{k+1}$. Equation 428 may be used for indirectly iteratively calculating population variance $vp_{k+1}$ based on components $S_{k+1}$, or $\bar{x}_{+1}$, or $S_{k+1}$ and $\bar{x}_{k+1}$, and $SS_{k+1}$. Equation 429 may be used for indirectly iteratively calculating sample standard deviation $s_{k+1}$ either using component $vs_{k+1}$ or using components $S_{k+1}$, or $\bar{x}_{k+1}$, or $S_{k+1}$ and $\bar{x}_{k+1}$, and $SS_{k+1}$. Equation 430 may be used for indirectly iteratively calculating population standard deviation $\sigma_{k+1}$ either using component $vp_{k+1}$ or using components $S_{k+1}$, or $\bar{x}_{+1}$, or $S_{k+1}$ and $\bar{x}_{k+1}$, and $SS_{k+1}$.

FIG. 5A illustrates an example of calculating a sample variance and a sample standard deviation for Big Data Set 501 using traditional algorithms. Big Data Set 501 is either a Big Data set. Computation subset size 502 (n) is 8. Computation subset 503 includes the first eight elements in Big Data Set 501. For each computation subset, equation 402 is used for calculating a mean, then equation 403 is used for calculating a sample variance, and finally equation 405 is used for calculating a sample standard deviation. For example, for computation subset 503 the mean is calculated to be 4.75. Calculating the mean includes 1 division operation and 7 addition operations. Calculating the sample variance includes 1 division, 8 multiplications, 7 additions and 9 subtractions. Thus, the total number of operations includes 2 divisions, 8 multiplications, 14 additions, and 9 subtractions for calculating the sample variance without any optimization. Calculating the sample standard deviation includes an additional square root operation.

The same equations may be used for calculating the sample variance and the sample standard deviation for computation subsets 504 and 505 respectively. Each of these calculations also includes 2 divisions, 8 multiplications, 14 additions, and 9 subtractions for calculating the sample variance without any optimization. Calculating the sample standard deviation includes an additional square root operation. Traditional algorithms for calculating variance on n data elements will typically take 2 divisions, n multiplications, 2(n−1) additions, and n+1 subtractions without any optimization.

FIG. 5B illustrates an example of calculating a sample variance and a sample standard deviation using iterative algorithm 1. A mean instead of a sum is used in this example. The calculations for computation subset 503 are essentially the same as shown in FIG. 5A. There are a total of 2 divisions, 8 multiplications, 14 additions, and 9 subtractions for calculating the sample variance. Calculating the sample standard deviation includes an additional square root operation.

However, starting from computation subset 504, the sample variance and/or sample standard deviation can be iteratively calculated. Equations 414 may be used for directly iteratively calculating component $\bar{x}_2$ for the computation subset 504 based on component $\bar{x}_1$ for the computation subset 503, and equation 415 may be used for directly iteratively calculating the sample variance $vs_2$ based on components $vs_1$, $\bar{x}_1$ and $\bar{x}_2$, and equation 416 may be used for indirectly iteratively calculating the sample standard deviation for computation subset 504. Equation 414 includes 1 division, 1 addition and 1 subtraction. Equation 415 includes 1 division, 1 multiplication, 3 additions, and 3 subtractions. Thus, the total operations include 2 divisions, 1 multiplication, 4 additions, and 4 subtractions for calculating the sample variance. Calculating the sample standard deviation using equation 416 includes an additional square root operation.

Equations 414, 415 and 416 may also be used for iteratively calculating the sample variance and the sample standard deviation for computation subset 505. These calculations also include 2 divisions, 1 multiplication, 4 additions, and 4 subtractions for calculating the sample variance and with 1 additional square root for calculating the sample standard deviation. As such, the number of operations used when iteratively calculating the variance and the standard deviation is (potentially substantially) less than when using traditional equations.

FIG. 5C illustrates an example of calculating a sample variance and a sample standard deviation using iterative algorithm 2. A mean instead of a sum is used in this example. The calculations for computation subset 503 use traditional equations to calculate the initial values of components $\bar{x}_1$ and $SSD_1$. There are 2 divisions, 8 multiplications, 14 additions, and 9 subtractions for calculating the sample variance. Calculating the sample standard deviation includes an additional square root operation.

However, starting from computation subset 504, the sample variance and/or sample standard deviation may be iteratively calculated. Equations 414 may be used for directly iteratively calculating component $\bar{x}_2$ for the computation subset 504 based on component $\bar{x}_1$ for the computation subset 503, and equation 419 may be used for directly iteratively calculating component $SSD_2$ based on components $SSD_1$, $\bar{x}_1$ and $\bar{x}_2$. Equation 420 may be used for indirectly iteratively calculating the sample variance $vs_2$ based on component $SSD_2$. Equation 422 may be used for indirectly iteratively calculating sample standard deviation $s_2$ for computation subset 504 based on component $vs_2$. Equation 414 includes 1 division, 1 addition and 1 subtraction. Equation 420 includes 1 division, and 1 subtraction. Thus, the total operations include 2 divisions, 1 multiplication, 4 additions, and 4 subtractions for calculating the sample variance $vs_2$. Calculating the sample standard deviation $s_2$ using equation 422 includes an additional square root operation.

Equations 414, 419, 420 and 422 may also be used for iteratively calculating the sample variance and the sample standard deviation for computation subset 505 from the components for computation subset 504. These calculations also include 2 divisions, 1 multiplication, 4 additions, and 4 subtractions for calculating the sample variance and with 1 additional square root for calculating the sample standard deviation. As such, the number of operations used when iteratively calculating the variance and the standard deviation is (potentially substantially) less than when using traditional equations.

FIG. 5D illustrates an example of calculating a sample variance and a sample standard deviation using iterative algorithm 3. A mean instead of a sum is used in this example. The calculations for computation subset 503 use traditional equations to calculate the initial values of components $\bar{x}_1$ and $SS_1$. Equation 402 is used for calculating component $\bar{x}_1$, and equation 424 is used for calculating component $SS_1$. Equation 427 is used for calculating the sample variance $vs_1$. Equation 429 is used for calculating the sample standard deviation $s_1$. There are 2 divisions, 10 multiplications, 14 additions, and 2 subtractions for calculating the sample variance. Calculating the sample standard deviation includes an additional square root operation.

However, starting from computation subset 504, the sample variance and/or sample standard deviation may be iteratively calculated. Equations 414 may be used for directly iteratively calculating component $\bar{x}_2$ for the computation subset 504 based on component $\bar{x}_1$ for the computation subset 503, and equation 426 may be used for directly iteratively calculating component $SS_2$ for the computation subset 504 based on component $SS_1$ for the computation subset 503. Equation 427 may be used for indirectly iteratively calculating the sample variance $vs_2$ based on components $SS_2$ and $\bar{x}_2$. Equation 429 may be used for indirectly iteratively calculating sample standard deviation $s_2$ for computation subset 504 using component $vs_2$. Equation 414 includes 1 division, 1 addition and 1 subtraction. Equation 426 includes 2 multiplications, 1 addition and 1 subtraction. Equation 427 includes 1 division, 2 multiplications, and 2 subtractions. Thus, the total operations include 2 divisions, 4 multiplications, 2 additions, and 4 subtractions for calculating the sample variance $vs_2$. Calculating the sample standard deviation $s_2$ using equation 429 includes an additional square root operation.

Equations 414, 426, 427 and 429 may also be used for iteratively calculating the sample variance and the sample standard deviation for computation subset 505 from the components for computation subset 504. These calculations also include 2 divisions, 4 multiplications, 2 additions, and 4 subtractions for calculating the sample variance $vs_2$ and with one additional square root for calculating the sample standard deviation $s_2$. As such, the number of operations used when iteratively calculating the variance and the standard deviation is (potentially substantially) less than when using traditional equations.

FIG. 5A-5B demonstrates iterative sample variance and iterative standard deviation calculations. Similar calculations for population variance and population standard deviation may also be demonstrated.

FIG. 6 illustrates computational loads for traditional sample variance calculation algorithms and example iterative sample variance calculation algorithms for n=8. As depicted, there are fewer multiplication operations, fewer addition operations, and fewer subtraction operations using any one of the example iterative algorithms.

FIG. 7 illustrates computational loads for traditional sample variance calculation algorithms and example iterative sample variance calculation algorithms for n=1,000,000. As depicted, there are substantially fewer multiplication operations, fewer addition operations, and fewer subtraction operations using any one of the example iterative algorithms.

FIG. 8 illustrates computational loads for traditional sample standard deviation calculation algorithms and example iterative sample standard deviation calculation algorithms for n=8. As depicted, there are fewer multiplication operations, fewer addition operations, and fewer subtraction operations using any one of the example iterative algorithms.

FIG. 9 illustrates computational loads for traditional standard deviation calculation algorithms and iterative standard deviation calculation algorithms with a computation subset of size 1,000,000. As depicted, there are substantially fewer multiplication operations, fewer addition operations, and fewer subtraction operations using any one of the example iterative algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for calculating at least one of a variance and a standard deviation for a modified computation subset on a computing-device-based computing system which comprises one or more computing devices and one or more storage media, each of the one or more computing devices comprising one or more processors, the method comprising:

initializing, by the computing-device-based computing system, two or more components of at least one of a variance and a standard deviation for a pre-modified computation subset, wherein the pre-modified computation subset contains a specified number, n (n>6), of data elements of a data set on at least one of the one or more storage media;

accessing, by the computing-device-based computing system, a data element to be removed from the pre-modified computation subset and a data element of the data set to be added to the pre-modified computation subset;

modifying, by the computing-device-based computing system, the pre-modified computation subset by:
  removing the to be removed data element from the pre-modified computation subset; and
  adding the to be added data element to the pre-modified computation subset;

directly iteratively deriving, by the computing-device-based computing system and based at least in part on the two or more components of at least one of a variance and a standard deviation for the pre-modified computation subset, two or more components of at least one of a variance and a standard deviation for the modified computation subset, wherein the directly iteratively deriving includes:
  accessing the two or more components without accessing all data elements in the modified computation subset to reduce data accessing latency thereby saving computing resources and reducing the computing-device-based computing system's power consumption; and
  removing any contribution of the removed data element from each of the accessed components mathematically and adding any contribution of the added data element to each of the accessed components mathematically wherein not all data elements in the modified computation subset are used during the iteratively deriving the two or more components to reduce the number of operations performed by the computing system thereby increasing calculation efficiency; and
generating, by the computing-device-based computing system, at least one of a variance and a standard deviation for the modified computation subset based on one or more of the iteratively derived components.

2. The computing-system-implemented method of claim 1, wherein generating at least one of a variance and a standard deviation for the modified computation subset includes generating at least one of a sample variance and a sample standard deviation.

3. The computing-system-implemented method of claim 1, wherein generating at least one of a variance and a standard deviation for the modified computation subset includes generating at least one of a population variance and a population standard deviation.

4. The computing-system-implemented method of claim 1, wherein the generating at least one of a variance and a standard deviation further comprises indirectly iteratively deriving, by the computing-device-based computing system, one or more components, wherein the indirectly iteratively deriving of the one or more components includes individually calculating each respective one of the one or more components based on one or more components other than the respective one component.

5. The computing-system-implemented method of claim 1, wherein accessing the data element to be removed and the data element to be added includes accessing a plurality of z data elements to be removed and a plurality of z data elements to be added, and wherein the method further comprises iteratively performing, for each of the respective z data elements to be removed and each of the respective z data elements to be added, the modifying the modifying the pre-modified computation subset, the directly iteratively deriving the two or more components for the modified computation subset, and the generating at least one of a variance and a standard deviation for the modified computation subset.

6. The computing-system-implemented method of claim 5, wherein the generating at least one of a variance and a standard deviation for the modified computation subset comprises generating at least one of a variance and a standard deviation for a modified computation subset only when the variance and/or the standard deviation is accessed.

7. The computing-system-implemented method of claim 6, wherein the generating at least one of a variance and a standard deviation for a modified computation subset further comprises indirectly iteratively deriving, by the computing-device-based computing system, one or more components of the at least one of a variance and a standard deviation for the modified computation subset, wherein the indirectly iteratively deriving of the one or more components includes individually calculating each respective one of the one or more components based on one or more components other than the respective one component.

8. The computing-system-implemented method of claim 1, wherein accessing the data element to be removed and the data element to be added includes accessing a plurality of z data elements to be removed and a plurality of z data elements to be added, and wherein the method further comprises iteratively performing, for each of the respective z data elements to be removed and each of the respective z data elements to be added, the modifying the pre-modified computation subset, and the directly iteratively deriving the two or more components for the modified computation subset.

9. A computing system, the computing system comprising:
  one or more computing devices;
  each computing device comprising one or more processors;
  one or more storage media; and
  one or more calculation modules that, when executed by at least one of the one or more computing devices, determines at least one of a variance and a standard deviation for data elements in a modified computation subset, the one or more calculation modules configured to:
  a. initialize two or more components of a variance and/or a standard deviation for a pre-modified computation subset, wherein the pre-modified computation subset contains a specified number, n (n>6), of data elements of a data set on at least one of the one or more storage media;
  b. access a data element to be removed from the pre-modified computation subset and a data element to be added to the pre-modified computation subset;
  c. modify the pre-modified computation subset, wherein modification of the pre-modified computation subset includes to remove the to-be-removed data element from the pre-modified computation subset and to add the to-be-added data element to the pre-modified computation subset;
  d. directly iteratively calculate two or more components of at least one of a variance and a standard deviation for the modified computation subset based at least in part on the two or more components of the variance and/or the standard deviation for the pre-modified computation subset, wherein direct iterative calculation of the two or more components includes to remove any contribution of the removed data element from each of the two or more components for the pre-modified computation subset mathematically and to add any contribution of the added data element to each of the two or more components for the pre-modified computation subset mathematically without accessing and using all data elements in the modified computation subset to reduce data access latency and the number of operations performed by the computing system, thereby increasing calculation efficiency, saving computing resources and reducing the computing system's power consumption; and e. generate, at least one of a variance and a standard deviation for the modified computation subset based on one or more of the iteratively calculated components.

10. The computing system of claim 9, wherein the one or more calculation modules, when executed by at least one of the one or more computing devices, generate one or more of a group that includes a sample variance, a sample standard deviation, a population variance, and a population standard deviation.

11. The computing system of claim 9, wherein the one or more calculation modules, when executed by at least one of the one or more computing devices, perform c, d, and e each time b is performed.

12. The computing system of claim 11, wherein the performing e comprises generating at least one of a variance and a standard deviation for a modified computation subset only when the variance and the standard deviation is accessed.

13. The computing system of claim 12, wherein the generating at least one of a variance and a standard deviation for a modified computation subset comprises indirectly iteratively calculating one or more components of the variance and/or the standard deviation for the modified computation subset, wherein indirectly iteratively calculating one or more components includes individually calculating each respective one of the one or more components based on one or more components other than the respective one component.

14. The computing system of claim 9, wherein the one or more calculation modules, when executed by at least one of the one or more computing devices, perform c and d each time b is performed.

15. A computing system program product for use at a configured computing system that comprises one or more computing devices and one or more storage media, the computing system program product comprising one or more non-transitory computing-device-readable storage media having stored thereon computing-device-executable instructions that, when executed by at least one of the one or more computing devices in the configured computing system, cause the configured computing system to perform a method for generating at least one of a variance and a standard deviation for a modified computation subset, the method including steps to:

initialize, by the configured computing system, two or more components of at least one of a variance and a standard deviation for a pre-modified computation subset, wherein the pre-modified computation subset contains a specified number, n (n>6), of data elements of a data set on at least one of the one or more storage media;

access, by the configured computing system, a data element of the data set to be removed from the pre-modified computation subset and a data element of the data set to be added to the pre-modified computation subset;

modify, by the configured computing system, the pre-modified computation subset by removing the to be removed data element from the pre-modified computation subset and adding the to be added data element to the pre-modified computation subset; directly iteratively calculate, by the configured computing system, two or more components of at least one of a variance and a standard deviation for the modified computation subset based at least in part on the two or more components initialized or calculated for the pre-modified computation subset, including to:

access the two or more components without accessing all data elements in the modified computation subset to reduce data accessing latency thereby saving computing resources and reducing the computing system's power consumption;

remove any contribution of the removed data element from each of the accessed components mathematically and add a contribution of the added data element to each of the accessed components mathematically without using all data elements in the modified computation subset in order to reduce the number of operations performed by the configured computing system thereby increasing calculation efficiency; and generate, by the configured computing system, at least one of a variance and a standard deviation for the modified computation subset based on one or more of the iteratively calculated components.

16. The computing system program product of claim 15, wherein generating the at least one of a variance and a standard deviation for the modified computation subset includes generating one or more of a group that includes a sample variance, a sample standard deviation, a population variance, and a population standard deviation for the modified computation subset.

17. The computing system program product of claim 15, wherein the computing-device-executable instructions that, when executed, further cause the configured computing system to access a data element to be removed and a data element to be added, to modify the pre-modified computation subset, to directly iteratively calculate two or more components, and to generate at least one of a variance and a standard deviation for the modified computation subset for each of multiple data elements to be removed and each of multiple data elements to be added.

18. The computing system program product of claim 17, wherein the computing-device-executable instructions that, when executed, cause the configured computing system to generate at least one of a variance and a standard deviation for the modified computation subset comprises computing-device-executable instructions that, when executed, cause the configured computing system to generate at least one of a variance and a standard deviation for a modified computation subset only when the at least one of a variance and a standard deviation is accessed.

19. The computing system program product of claim 18, wherein the computing-device-executable instructions that, when executed, cause the configured computing system to generate at least one of a variance and a standard deviation for the modified computation subset comprises computing-device-executable instructions that, when executed, cause the configured computing system to indirectly iteratively calculate one or more components of the at least one of a variance and a standard deviation for the modified computation subset, wherein indirectly iteratively calculating the one or more components includes individually calculating each respective one of the one or more components based on one or more components other than the respective one component.

20. The computing system program product of claim 15, wherein the computing-device-executable instructions that, when executed, further cause the configured computing system to access a data element to be removed and a data element to be added, to modify the pre-modified computation subset, to directly iteratively calculate two or more components for each of multiple data elements to be removed and each of multiple data elements to be added.

* * * * *